US010630128B2

(12) United States Patent
Tillotson et al.

(10) Patent No.: US 10,630,128 B2
(45) Date of Patent: Apr. 21, 2020

(54) EDDY CURRENT REPULSION MOTOR

(71) Applicant: The Boeing Company, Chicago, IL (US)

(72) Inventors: Brian Jay Tillotson, Kent, WA (US); Peng Zeng, Newcastle, WA (US)

(73) Assignee: The Boeing Company, Chicago, IL (US)

(*) Notice: Subject to any disclaimer, the term of this patent is extended or adjusted under 35 U.S.C. 154(b) by 391 days.

(21) Appl. No.: 14/933,333

(22) Filed: Nov. 5, 2015

(65) Prior Publication Data
US 2017/0133957 A1    May 11, 2017

(51) Int. Cl.
H02K 3/28 (2006.01)
H02K 19/06 (2006.01)
H02P 25/08 (2016.01)
H02P 6/15 (2016.01)
H02K 19/10 (2006.01)
H02K 11/21 (2016.01)
H02K 11/00 (2016.01)
H02P 6/16 (2016.01)
H02K 1/24 (2006.01)
H02K 1/02 (2006.01)

(52) U.S. Cl.
CPC ............ H02K 3/28 (2013.01); H02K 11/0094 (2013.01); H02K 11/21 (2016.01); H02K 19/06 (2013.01); H02K 19/103 (2013.01); H02P 6/15 (2016.02); H02P 6/16 (2013.01); H02P 25/08 (2013.01); H02K 1/02 (2013.01); H02K 1/246 (2013.01)

(58) Field of Classification Search
CPC .. H02P 6/00; H02P 6/16; H02K 11/00; H02K 3/28
See application file for complete search history.

(56) References Cited

U.S. PATENT DOCUMENTS

| 5,168,203 A | 12/1992 | Tepavcevic |
| 8,884,562 B1 | 11/2014 | Cameron, Jr. |
| 9,164,497 B2 | 10/2015 | Cameron et al. |
| 2002/0033638 A1* | 3/2002 | Okada ............ B60T 8/171 303/20 |
| 2005/0225188 A1* | 10/2005 | Griepentrog ............ H01F 38/18 310/112 |
| 2007/0001533 A1* | 1/2007 | Jansen ............ H02K 1/24 310/156.19 |

(Continued)

FOREIGN PATENT DOCUMENTS

| EP | 0892490 A | 1/1999 |
| GB | 22498394 A | 7/2013 |
| WO | WO9642132 A1 | 12/1996 |

OTHER PUBLICATIONS

Cameron, Jr., "Current Control in Brushless DC Motors," U.S. Appl. No. 14/506,619, filed Oct. 4, 2014, 43 pages.

(Continued)

Primary Examiner — Eduardo Colon Santana
Assistant Examiner — Said Bouziane
(74) Attorney, Agent, or Firm — Yee & Associates, P.C.

(57) ABSTRACT

A method and apparatus for controlling an electric motor. A flow of an alternating current through stator coils in the electric motor is controlled based on a position of a rotor in the electric motor such that a repulsive force between a rotor and a stator coil in the stator coils occurs when the alternating current flows through the stator coil.

28 Claims, 10 Drawing Sheets

(56) References Cited

U.S. PATENT DOCUMENTS

| | | | |
|---|---|---|---|
| 2008/0124233 A1* | 5/2008 | Spooner | F01D 15/10 |
| | | | 417/423.7 |
| 2012/0055148 A1* | 3/2012 | Leonard | B60K 6/12 |
| | | | 60/413 |
| 2012/0175975 A1 | 7/2012 | Kyung et al. | |
| 2016/0141923 A1* | 5/2016 | Frolich | H02K 1/246 |
| | | | 310/46 |

OTHER PUBLICATIONS

Extended European Search Report, dated May 4, 2017, regarding Application No. 16196686.6, 10 pages.

* cited by examiner

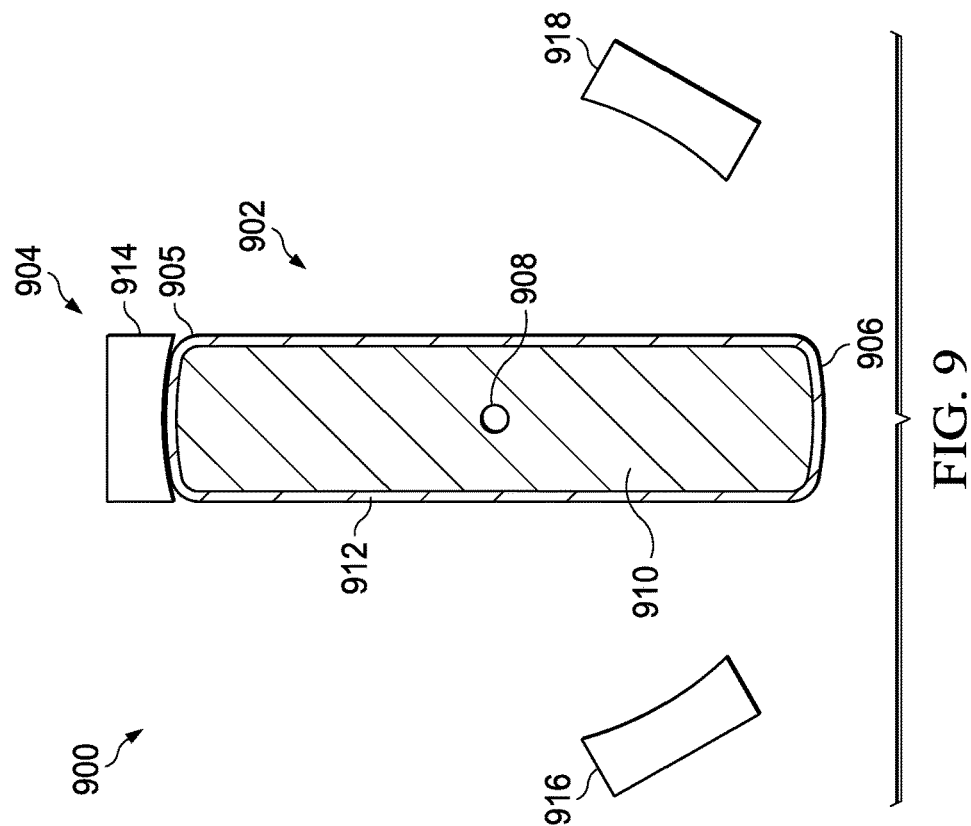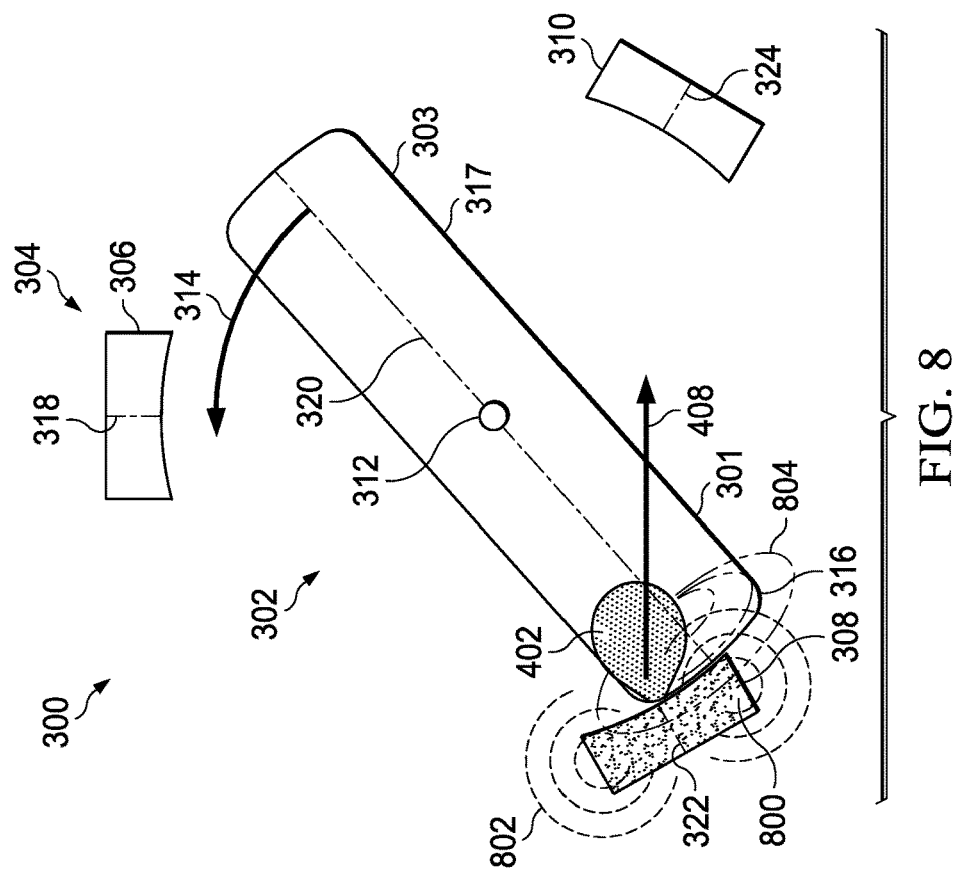

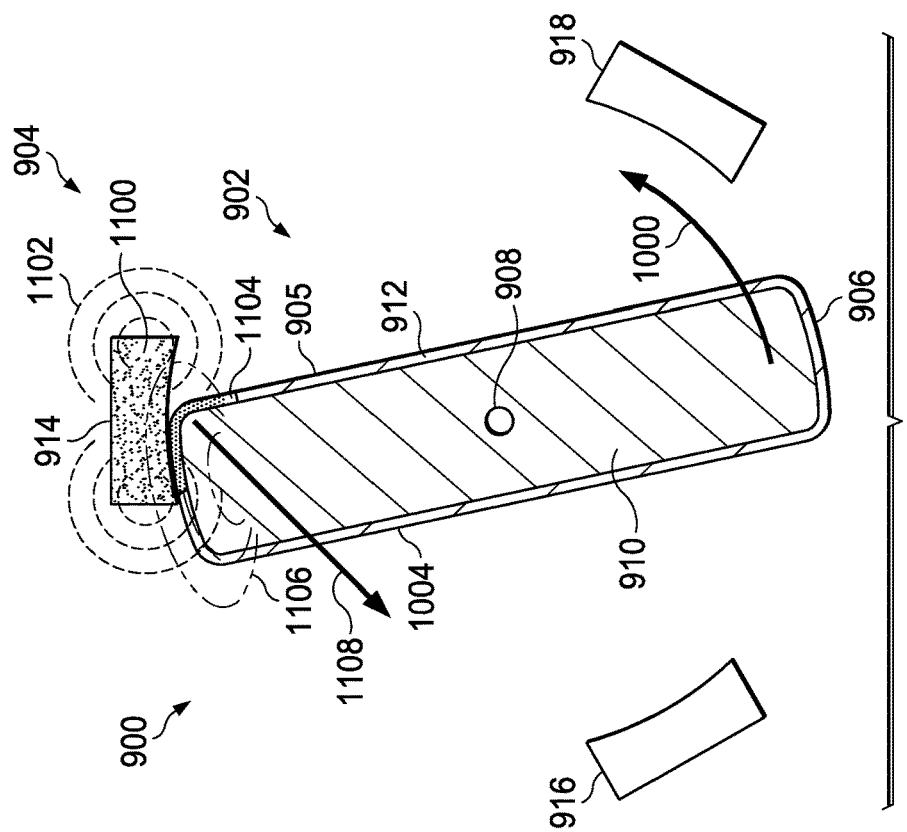
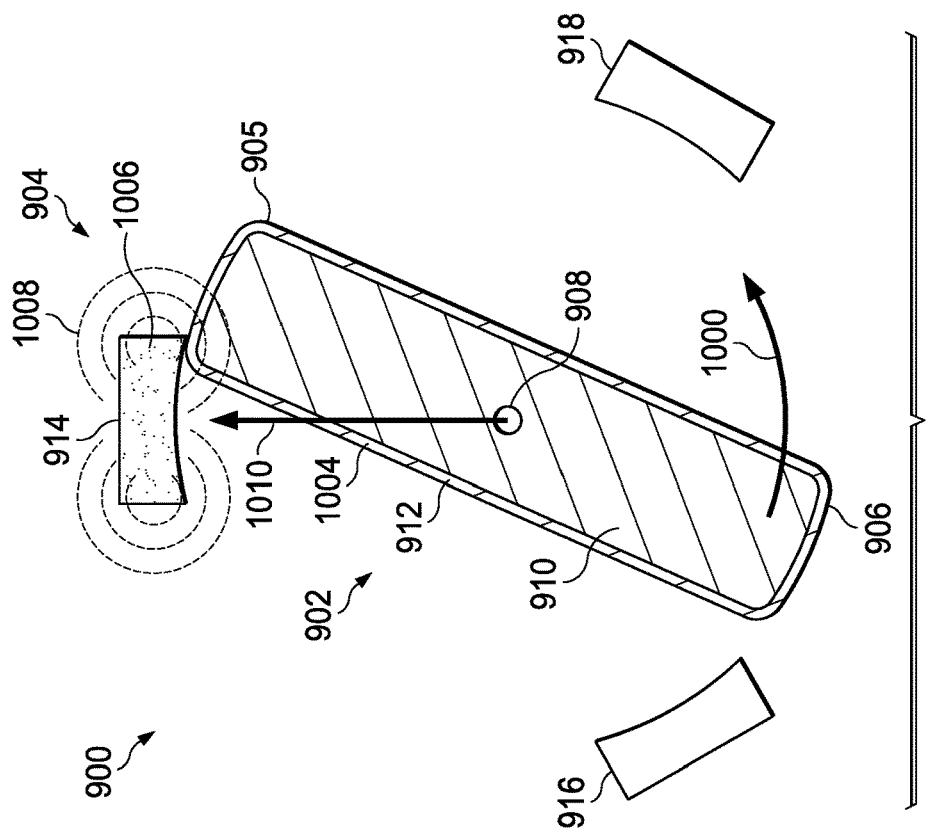
FIG. 11
FIG. 10

EDDY CURRENT REPULSION MOTOR

BACKGROUND INFORMATION

1. Field

The present disclosure relates generally to electric motors and, in particular, to electric motors that use alternating currents.

2. Background

An electric motor is a device that converts electrical power into mechanical power. Electric motors may be used for various applications. For example, without limitation, electric motors may be used to drive fans, pumps, tools, disk drives, drills, and other types of devices. Electric motors may be used in various environments. For example, electric motors may be used for applications on various fixed and mobile platforms, such as aircraft and other vehicles.

Electric motors may be used on aircraft to perform various functions. For example, without limitation, electric motors on an aircraft may be used to move flight control surfaces, raise and lower landing gear, open and close valves, and perform other functions on the aircraft.

When electric motors are used in aircraft, factors such as weight and space are important considerations. Currently used electric motors employ rotors that contain a ferromagnetic material. Ferromagnetic materials have a high density. As a result, the weight of the rotor may add more weight to the electric motor than desired. The rotor weight also may affect the responsiveness, speed, and power density of the electric motor.

For example, an electric motor may take an undesired amount of time to start and stop. The iron in the rotor results in a larger moment of inertia as compared to other lighter materials. The larger moment of inertia results in the undesired responsiveness. Additionally, electric motors may have a maximum speed limit caused by centrifugal stresses, commutation voltage limits, or some combination thereof.

Additionally, electric motors may be more costly than desired. For example, the materials and parts add to the cost of the electric motor.

As another example, the cost of assembly may be greater than desired. For example, manufacturing electric motors may include winding coils, stacking laminated iron sheets with insulating layers, and steps taken to assemble the electric motor. The steps to assemble the different parts add to the cost of the electric motors.

The manufacturing precision needed for electric motors also increases the cost. For example, electric motors may be very sensitive to air gap distances between the rotor and the stator coils. Thus, the number of parts and the different operations performed to assemble the parts into the electric motor may increase the cost more than desired.

A brushless direct current (DC) motor is a type of electric motor that uses permanent magnets. These permanent magnets are typically comprised of samarium cobalt or neodymium iron boron. These types of magnets are expensive to fabricate and are more difficult to machine and assemble.

A brushless direct current motor includes weight from bearings that are selected to counteract wear and tear that may occur from heat generated by windings. The moment of inertia of this type of motor is often very large, reducing the responsiveness. The weight and heat in the windings also limit speed of the brushless direct current motor.

A reluctance motor is a type of electric motor that includes nonpermanent magnetic poles on a ferromagnetic rotor. Torque is generated using magnetic reluctance. This type of motor is less costly than a brushless direct current motor because the reluctance motor does not use permanent magnets.

However, a reluctance motor still typically uses stacked laminates for both the rotor and stator. With the use of laminates and ferromagnetic material in the rotor and flux return paths, the weight may be higher than desired.

Further, only an attraction between the stator and rotor occurs limiting the responsiveness of this type of motor. Additionally, faster commutation with this type of motor requires a higher voltage to stop or reverse direction. The reluctance motor has a fixed speed for a particular supply voltage, and the speed also is constrained by centrifugal stress in the rotor.

An induction motor is an alternating current (AC) electric motor, in which the electric current in the rotor used to produce torque is obtained by electromagnetic induction from a magnetic field generated by windings in the stator. An induction motor has a lower cost as compared to other electric motors that use permanent magnets. Additionally, an induction motor is easier to control than other types of electric motors, thus resulting in less complex control circuits.

However, an induction motor is relatively heavy because of the squirrel cage rotor design. This type of rotor design uses stacked laminates, windings, or overly molded electronically conductive materials. With this weight of the rotor, the response of an induction motor may not be as great as desired, especially when reversing direction.

Therefore, it would be desirable to have a method and apparatus that take into account at least some of the issues discussed above, as well as other possible issues. For example, it would be desirable to have a method and apparatus that overcome a technical problem with the weight of electric motors. As another example, it would be desirable to have a method and apparatus that overcome a technical problem with the cost of electric motors. It would be desirable to have a method and apparatus that overcome a technical problem with the responsiveness and speed of electric motors.

SUMMARY

An embodiment of the present disclosure provides an apparatus. The apparatus comprises a rotor, stator coils, and a current control system. The rotor is comprised of an electrically conductive material, wherein the rotor is rotatable about an axis. The stator coils are positioned adjacent to the rotor such that an eddy current is generated in the rotor when an alternating current flows through the stator coils. The current control system controls a flow of the alternating current through the stator coils based on a position of the rotor, wherein a stator coil in the stator coils generates an alternating magnetic field when the alternating current flows through the stator coil causing the eddy current in the rotor such that a repulsive force between the stator coil and the rotor rotates the rotor about the axis.

A further illustrative embodiment of the present disclosure provides a dual frequency electric motor. The dual frequency electric motor is comprised of a rotor, stator coils, and a current control system. The rotor is rotor rotatable about an axis, wherein the rotor comprises a core formed from ferromagnetic material and a layer encompassing the core, wherein the layer comprises a conductive material that is non-ferromagnetic. The stator coils are connected to an alternating current power supply and a direct current power supply. The current control system controls a flow of an alternating current and a direct current through the stator coils based on a position of the rotor, wherein a stator coil in the stator coils generates an alternating magnetic field when the alternating current flows through the stator coil causing a repulsive force between the stator coil and the rotor and generates a unidirectional magnetic field when the direct current flows through the stator coil causing an attractive force between the stator coil and the rotor such that the rotor rotates about the axis.

A yet further illustrative embodiment of the present disclosure provides a method for controlling an electric motor. A flow of an alternating current through stator coils in the electric motor is controlled based on a position of a rotor in the electric motor such that a repulsive force between the rotor and a stator coil in the stator coils occurs when the alternating current flows through the stator coil.

A still further illustrative embodiment of the present disclosure provides a method for controlling an electric motor. A direct current is sent through a stator coil in stators coils in the electric motor when a rotor of the electric motor is in a first position relative to the stator coil, wherein an attractive force between the stator coil and the rotor rotates the rotor about an axis. An alternating current is sent through the stator coil in the electric motor when the rotor is in a second position relative to the stator coil, wherein a repulsive force between the stator coil and the rotor rotates the rotor about the axis.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of the operation of an electric motor using a repulsive force in accordance with an illustrative embodiment;

FIG. 9 is an illustration of a dual frequency electric motor in accordance with an illustrative embodiment;

FIG. 10 is an illustration of the operation of a dual frequency electric motor in accordance with an illustrative embodiment;

FIG. 11 is an illustration of the operation of a dual frequency electric motor in accordance with an illustrative embodiment;

DETAILED DESCRIPTION

Figure 1:
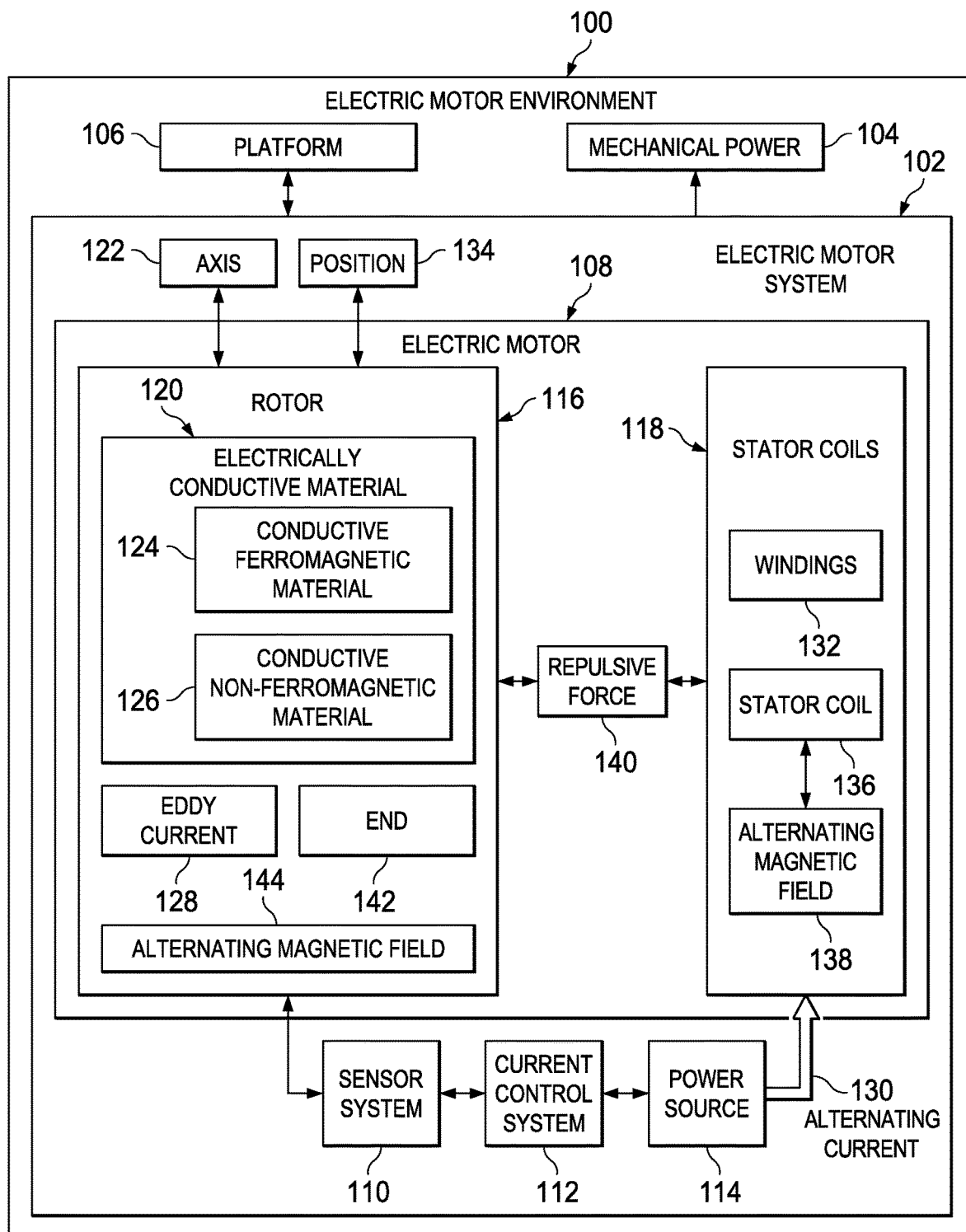
FIG. 1 is an illustration of a block diagram of an electric motor environment in accordance with an illustrative embodiment.

The illustrative embodiments recognize and take into account one or more different considerations. For example, the illustrative embodiments recognize and take into account that the use of ferromagnetic materials in a rotor and the number of parts in the rotor and other portions of the electric motor may result in a responsiveness that is not as great as desired, as well as a cost that is greater than desired. The illustrative embodiments also recognize and take into account that it would be desirable to have electric motors, in which the speed is not constrained by centrifugal stress that may occur in a rotor.

The illustrative embodiments also recognize and take into account that it is desirable to have lightweight electrical motors that provide greater torque in a smaller size as compared to currently available electric motors. For example, it is desirable to have a high acceleration and high power density in electric flight control actuators that may be placed into wings of an aircraft, such as an unmanned aerial vehicle.

The illustrative embodiments also recognize and take into account that a smaller size and a faster speed for electric motors for medical use or research is desirable. Smaller electrical motors with a desired amount of torque, as compared to currently available electric motors, may be useful for medical devices, such as prosthetics or implantable devices. With respect to research, electric motors that provide a desired level of rotational speed are desirable for medical devices, such as centrifuges.

The illustrative embodiments also recognize and take into account that weight, space, and speed are factors for electric motors used in cars. With electric cars and hybrid electric cars, and, in particular, in high performance versions of these types of cars, the size, weight, and speed of electric motors are considerations in designing vehicles.

Thus, the illustrative embodiments recognize and take into account that it would be desirable to have an electric motor with at least one of lower amounts of ferromagnetic material or fewer parts. As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments recognize and take into account that one manner, in which lower amounts of ferromagnetic material or fewer parts may be achieved, involves reducing the weight of the rotor. In this manner, limitations of responsiveness, speed, and power density may be reduced. In one illustrative example, magnetic fields with frequencies that cause an occurrence in a conductive material may be used in a manner that reduces the weight of a rotor in an electric motor.

As depicted, the illustrative embodiments recognize and take into account that an induced electric current flows in a direction that is opposite to the change which produced the induced electric current. Further, electric currents flowing in opposite directions tend to magnetically repel each other. In other words, these electric currents create magnetic fields that repel each other. As a result, induced currents known as "eddy currents" are typically repelled by the electric current that causes the "eddy currents".

In one illustrative example, an apparatus comprises a rotor, stator coils, and a current control system. The rotor comprises an electrically conductive material, wherein the rotor is rotatable about an axis. The stator coils are positioned adjacent to the rotor such that an eddy current is generated in the rotor when an alternating current flows through the stator coils. The current control system controls a flow of the alternating current through the stator coils based on a position of the rotor. A stator coil in the stator coils generates an alternating magnetic field when the alternating current flows through the stator coil, causing an eddy current in the stator coil, such that a repulsive force between the stator coil and the rotor rotates the rotor about the axis.

With reference now to the figures and, in particular, with reference to FIG. 1, an illustration of a block diagram of an electric motor environment is depicted in accordance with an illustrative embodiment. Electric motor environment 100 is an example of an environment in which an illustrative embodiment may be implemented.

Electric motor environment 100 may be any environment in which electric motor system 102 provides mechanical power 104 for platform 106. For example, without limitation, electric motor environment 100 may include a manufacturing environment, a research environment, a medical environment, a military environment, a transportation environment, or any other appropriate environment in which mechanical power 104 is required or desired for platform 106.

For example, platform 106 may be selected from a group comprising a mobile platform, a stationary platform, a land-based structure, an aquatic-based structure, and a space-based structure. More specifically, the platform may be selected from a group comprising a surface ship, a tank, a personnel carrier, a train, a spacecraft, a space station, a satellite, a submarine, an automobile, a power plant, a bridge, a dam, a house, a manufacturing facility, a building, and other suitable platforms. In one illustrative example, platform 106 may be a human body.

Electric motor system 102 may be configured to provide mechanical power 104 for any appropriate application in electric motor environment 100. For example, without limitation, the application may include driving a fan, a pump, a tool, a disk drive, a drill, any other appropriate type of device, or various combinations of devices. For example, without limitation, when platform 106 takes the form of an aircraft, the application for electric motor system 102 may include moving flight control surfaces, raising and lowering landing gear, and performing other functions or various combinations of functions on an aircraft.

In this illustrative example, electric motor system 102 includes a number of different components. As depicted, electric motor system 102 includes electric motor 108, sensor system 110, current control system 112, and power source 114.

Electric motor 108 generates mechanical power 104 in this illustrative example. Electric motor 108 includes rotor 116 and stator coils 118.

As depicted, rotor 116 is comprised of electrically conductive material 120. Further, rotor 116 is rotatable about axis 122. In the illustrative example, electrically conductive material 120 is selected from at least one of conductive ferromagnetic material 124 or conductive non-ferromagnetic material 126.

As depicted, conductive ferromagnetic material 124 is selected from at least one of iron, iron oxide, nickel, samarium cobalt, or some other suitable material. In this example, conductive non-ferromagnetic material 126 is selected from at least one of aluminum, copper, gold, intercalated graphene, lead, nickel, silver, tin, titanium, zinc, or some other suitable material.

Stator coils 118 are positioned adjacent to rotor 116. In the illustrative example, stator coils 118 are positioned adjacent to rotor 116 such that repulsive force 140 can be generated at a level that is sufficient to rotate rotor 116 from any stationary position of rotor 116.

The position is such that eddy current 128 is generated in rotor 116 when alternating current 130 flows through stator coils 118. In this illustrative example, alternating current 130 flows through windings 132 in stator coils 118. Windings 132 are electrically conductive wires laid up in coils in stator coils 118.

In the illustrative example, a first frequency of alternating current 130 is independent of a second frequency of a rotation of rotor 116. In other words, the first frequency is not related to the second frequency. For example, the first frequency is an integer multiple or a rational number product of the first frequency and the second frequency. In one illustrative example, the frequency of alternating current 130 is equal to or greater than about 10 kHz.

As depicted, the frequency may be selected based on a desired location for eddy current 128. For example, frequency may be based on whether it is desirable to have eddy current 128 be closer to the surface or deeper within rotor 116. The occurrence of eddy current 128 farther away from axis 122 results in greater torque in the illustrative examples.

Sensor system 110 identifies position 134 of rotor 116. As depicted, position 134 is sent to current control system 112 by sensor system 110.

In one illustrative example, sensor system 110 is a rotary encoder that indicates position 134 of rotor 116. The rotary encoder may be attached to at least one of rotor 116 or a shaft on which rotor 116 is mounted. In the illustrative example, the rotary encoder may be selected from one of a mechanical encoder, an optical encoder, a magnetic encoder, a capacitive encoder, or some other suitable encoding system.

In another illustrative example, sensor system 110 is a group of position sensing coils that reacts with eddy current 128 in rotor 116 based on position 134 of rotor 116, wherein position 134 of rotor 116 is identified using the group of position sensing coils.

With position sensing coils, an alternating current is continually sent through each of the position sensing coils. As rotor 116 turns, eddy current 128 is induced in rotor 116 by the position sensing coils. Eddy current 128 grows stronger as rotor 116 approaches a position sensing coil. As a result, the alternating current flowing through the position sensing stator coil is reduced. In this manner, the position of rotor 116 may be identified through the changing in the alternating current flowing through a position sensing coil as caused by eddy current 128.

The alternating current sent through the position sensing coils is weaker relative to alternating current 130. This alternating current is selected such that repulsive force 140 is not generated or small enough to not affect the rotation of rotor 116 in an undesired manner.

This type of implementation for sensor system 110 does not require optical components that may be blocked by dirt or other debris which may occur with a rotary encoder. In this manner, position 134 of rotor 116 may be determined based on the change in current flowing through the position sensing coils as affected by eddy current 128.

In this illustrative example, current control system 112 controls a flow of alternating current 130 through stator coils 118 based on position 134 of rotor 116. Current control system 112 may take the form of a commutator. As depicted, current control system 112 may connect different ones of stator coils 118 to power source 114 when position 134 of rotor 116 falls into selected positions with respect to stator coils 118.

Stator coil 136 in stator coils 118 generates alternating magnetic field 138 when alternating current 130 flows through stator coil 136 causing eddy current 128 in rotor 116 such that repulsive force 140 between stator coil 136 and rotor 116 rotates rotor 116 about axis 122.

More specifically, eddy current 128 generates alternating magnetic field 144. Alternating magnetic field 138 from stator coil 136 and alternating magnetic field 144 from end 142 of rotor 116 interact to generate repulsive force 140.

In the depicted example, current control system 112 sends alternating current 130 through stator coil 136 when position 134 of rotor 116 is such that end 142 of rotor 116 is adjacent to stator coil 136.

Figure 2:
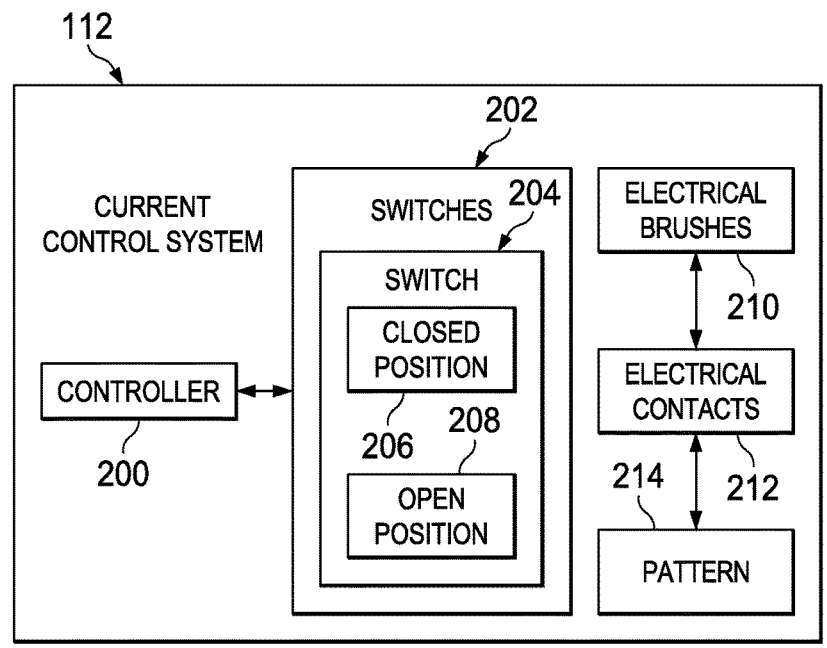
FIG. 2 is an illustration of a block diagram of a current control system in accordance with an illustrative embodiment.

With reference now to FIG. 2, an illustration of a block diagram of a current control system is depicted in accordance with an illustrative embodiment. In the illustrative examples, the same reference numeral may be used in more than one figure. This reuse of a reference numeral in different figures represents the same element in the different figures.

As depicted, current control system 112 may be implemented in a number of different ways. In one illustrative example, current control system 112 comprises controller 200 and switches 202.

Switches 202 are connected to stator coils 118 and to power source 114 in FIG. 1. As depicted, stator coils 118 are indirectly connected to power source 114 through switches 202. As depicted, each switch in switches 202 is connected to a corresponding stator coil in stator coils 118.

For example, switch 204 in switches 202 sends alternating current 130 through stator coil 136 when switch 204 is in closed position 206. When switch 204 is in open position 208, alternating current 130 does not flow through stator coil 136.

Controller 200 controls switches 202 by controlling the flow of alternating current 130 through stator coils 118 based on position 134 of rotor 116. In other words, controller 200 turns switches 202 on and off based on position 134 of rotor 116. Position 134 of rotor 116 is identified using sensor system 110 in FIG. 1.

In this illustrative example, stator coil 136 in stator coils 118 generates alternating magnetic field 138 when alternating current 130 flows through stator coil 136. Alternating magnetic field 138 causes eddy current 128 in rotor 116 such that repulsive force 140 between stator coil 136 and rotor 116 causes rotor 116 to rotate about axis 122. More specifically, eddy current 128 generates alternating magnetic field 144. Alternating magnetic field 138 from stator coil 136 and alternating magnetic field 144 from end 142 of rotor 116 interact to generate repulsive force 140.

Controller 200 is configured to switch alternating current 130 through stator coil 136 in stator coils 118 in which rotor 116 has the position in which end 142 of rotor 116 is aligned with stator coil 136. In the depicted example, the alignment is selected such that end 142 of rotor 116 is past the center of stator coil 136.

In addition to position, controller 200 may also switch off the flow of alternating current 130 to stator coil 136 when alternating current 130 is zero or near zero in the alternating current (AC) cycle. In this manner, the commutation voltage may be reduced. This reduction may allow the use of higher currents resulting in higher torque. The use of higher currents may occur without using expensive or heavy high-voltage components. Further, the pattern of turning the flow of alternating current 130 on and off may occur using a different phase angle relative to the rotor, as compared to an electric motor that uses an attractive magnetic force.

In the illustrative example, controller 200 may be implemented in software, hardware, firmware or a combination thereof. When software is used, the operations performed by controller 200 may be implemented in program code configured to run on hardware, such as a processor unit. When firmware is used, the operations performed by controller 200 may be implemented in program code and data and stored in persistent memory to run on a processor unit. When hardware is employed, the hardware may include circuits that operate to perform the operations in controller 200.

In the illustrative examples, the hardware may take the form of a circuit system, an integrated circuit, an application-specific integrated circuit (ASIC), a programmable logic device, or some other suitable type of hardware configured to perform a number of operations. For example, controller 200 may be comprised of at least one of a solid state circuit, a silicon controlled rectifier (SCR), a triode for alternating current circuit (TRIAC), or some other suitable type of circuit.

With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In another illustrative example, current control system 112 may be comprised of electrical brushes 210 and electrical contacts 212. In this illustrative example, stator coils 118 have first ends that are connected to power source 114. Electrical brushes 210 are connected to second ends of stator coils 118.

Electrical contacts 212 are positioned about axis 122 in FIG. 1. Electrical contacts 212 are connected to power source 114. As depicted, electrical brushes 210 may contact electrical contacts 212 depending on position 134 of rotor 116.

Electrical contacts 212 rotate as rotor 116 rotates. Further, electrical contacts 212 are arranged in pattern 214 such that electrical brushes 210 contact electrical contacts 212 at different positions of rotor 116 when electrical contacts 212 rotate about axis 122, controlling the flow of alternating current 130 through stator coils 118.

As depicted, electrical contacts 212 are associated with rotor 116. The association may be a direct association, in which electrical contacts 212 are located on rotor 116. In another example, the association may be an indirect one, in which electrical contacts 212 are located on a shaft connected to rotor 116.

The use of electrical brushes 210 and electrical contacts 212 may have a lower cost and reduce the use of electrical circuits in electric motor system 102. As a result, a reduced cost may occur with this type of configuration.

Thus, the illustrative examples provide one or more technical solutions to overcome a technical problem with the weight of electric motors. For example, lighter materials may be used in electric motor 108 in place of materials used in currently used electric motors.

As another example, the illustrative examples provide a technical solution that overcomes a technical problem with the cost of electric motors. For example, fewer components may be used in manufacturing electric motor 108, leading to lower cost of components and lower cost than assembly. For example, rotor 116 in electric motor 108 does not need to use layers of laminates and heavy materials.

Further, the illustrative examples also may provide one or more of the technical solutions to overcome a technical problem with the responsiveness and speed of electric motors. Limitations on responsiveness and speed based on increased inertia may be reduced. Further, limitations on spots and speed based on stress on the rotor also may be reduced using an illustrative example. For example, rotor 116 may have a simpler design, as compared to currently used rotors to provide a desired level of performance.

The illustration of electric motor environment 100 and the different components in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sensor system 110 may identify other information in addition to or in place of position 134 of rotor 116. For example, sensor system 110 may identify information selected from at least one of a temperature, a speed, a torque, a magnetic field level, or some other desired information about electric motor 108.

In this illustrative example, power source 114 supplies alternating current 130 to stator coils 118. The supply of alternating current 130 occurs under the control of current control system 112. Alternating current 130 may be supplied directly or indirectly. For example, alternating current 130 may be supplied directly through wires or indirectly through wireless magnetic coupling to stator coils 118.

As another example, each of stator coils 118 may have a different resonant frequency from the other stator coils. The resonant frequency is a frequency at which the magnitude of the alternating current has the greatest response for a particular stator coil. In the illustrative example, the resonant frequency may be set by using a capacitor that is connected in parallel to the stator coil.

In this example, controller 200 includes a power transmitter that is configured to transmit power to stator coils 118 by wireless magnetic coupling to the stator coils 118. The power transmitted results in alternating current 130 flowing through stator coils 118.

In yet another illustrative example, sensor system 110 may be omitted when current control system 112 is an analog current control system. When electrical brushes and electrical contacts are present, sensor system 110 is not needed to identify position 134 of rotor 116.

With reference next to FIGS. 3-8, illustrations of the operation of an electric motor are depicted in accordance with illustrative embodiments. These figures illustrate how repulsive force is used to rotate a rotor of an electric motor.

Figure 3:
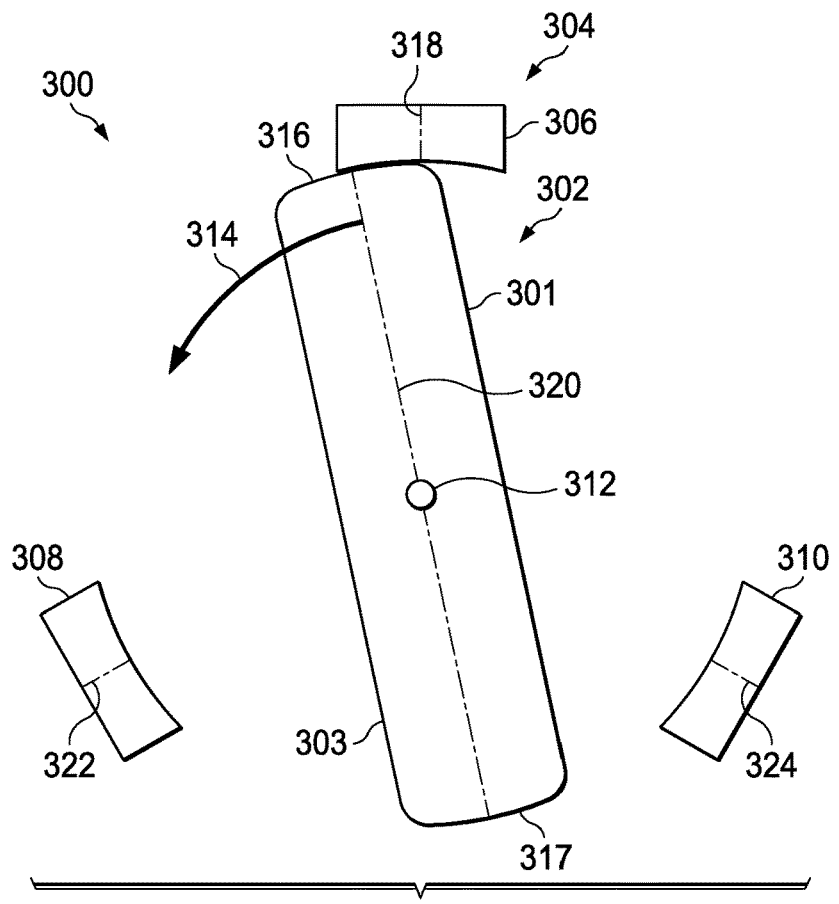
FIG. 3 is an illustration of an electric motor with a rotor in accordance with an illustrative embodiment.

Turning first to FIG. 3, an illustration of an electric motor with a rotor is depicted in accordance with an illustrative embodiment. In this illustrative example, electric motor 300 includes rotor 302 and stator coils 304.

As depicted, rotor 302 has arm 301 and arm 303 that extend from axis 312. In this illustrative example, rotor 302 does not include a magnetic material. Rotor 302 is comprised of an electrically conductive material in the form of a conductive non-ferromagnetic material. In this particular example, rotor 302 is comprised of aluminum.

In this illustrative example, stator coils 304 include stator coil 306, stator coil 308, and stator coil 310. Any number of stator coils 304 greater than two may be used in electric motor 300.

As depicted, rotor 302 is in a stationary position. This stationary position is a starting position in this illustrative example. In this example, the desired direction of rotation for rotor 302 is about axis 312 in the direction of arrow 314.

In this illustrative example, end 316 of arm 301 of rotor 302 is shown in a starting position with respect to stator coil 306. A sequence of operations activate and deactivate stator coils 304 to rotate rotor 302.

In the starting position of rotor 302, the alignment of end 316 of arm 301 of rotor 302 and stator coil 306 is such that centerline 320 of end 316 is offset from centerline 318 of stator coil 306. In other words, end 316 is past the center of stator coil 306. In this illustrative example, the offset is measured in degrees. The offset may be, for example, one degree or two degrees.

A centerline is a line that divides or bisects an object into halves, such as rotor 302 and stator coil 306. As depicted, stator coil 308 has centerline 322, and stator coil 310 has centerline 324. The centerlines in these depicted examples are imaginary and not actually seen on the structures.

The offset depicted in this example results in the rotation of rotor 302 in the direction of arrow 314 when the operation of electric motor 300 begins. The size of the offset between centerline 318 and centerline 320 may vary, depending on the amount of repulsive force desired when an alternating current is applied to stator coil 306.

Figure 4:
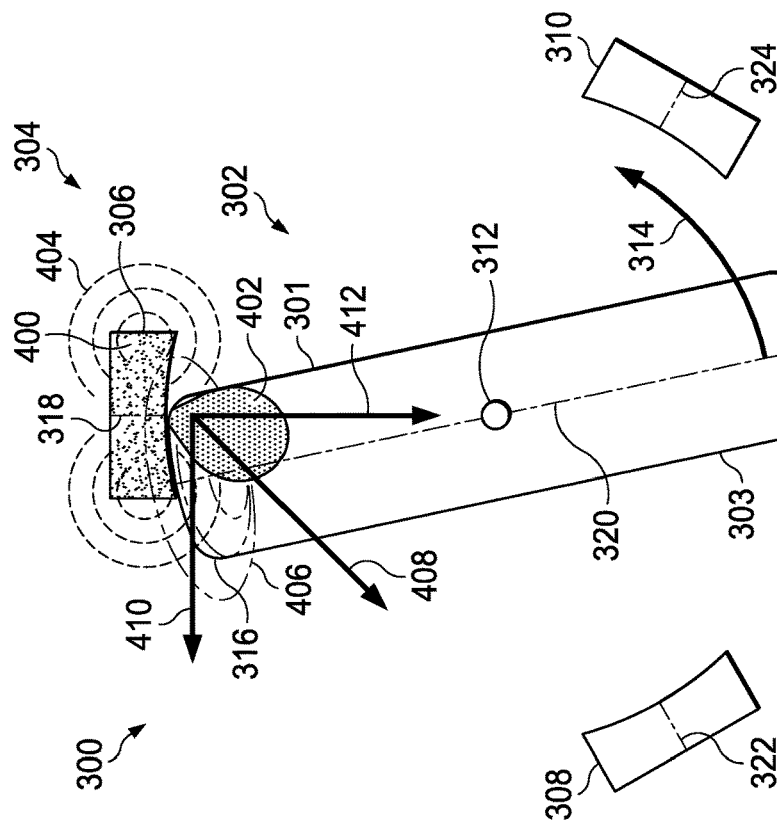
FIG. 4 is an illustration of the operation of an electric motor in accordance with an illustrative embodiment.

With reference now to FIG. 4, an illustration of the operation of an electric motor is depicted in accordance with an illustrative embodiment. As depicted, stator coil 306 is turned on when alternating current 400 flows through stator coil 306.

The flow of alternating current 400 causes alternating magnetic field 404 to be generated. As a result of alternating magnetic field 404, eddy current 402 is generated in end 316 of rotor 302. Eddy current 402 generates alternating magnetic field 406.

In this illustrative example, alternating current 400 may have a relatively high frequency as compared to other alternating current motors that are currently available. For example, the frequency may be equal to or greater than 10 kHz.

The magnetic fields from these two currents result in repulsive force 408. In turn, repulsive force 408 causes a rotation of rotor 302 in the direction of arrow 314, as shown in this figure.

As depicted, repulsive force 408 has two components. These components are tangential force 410 and radial force 412. These components are relative to the rotation of rotor 302. Tangential force 410 produces a torque that turns rotor 302.

Figure 5:
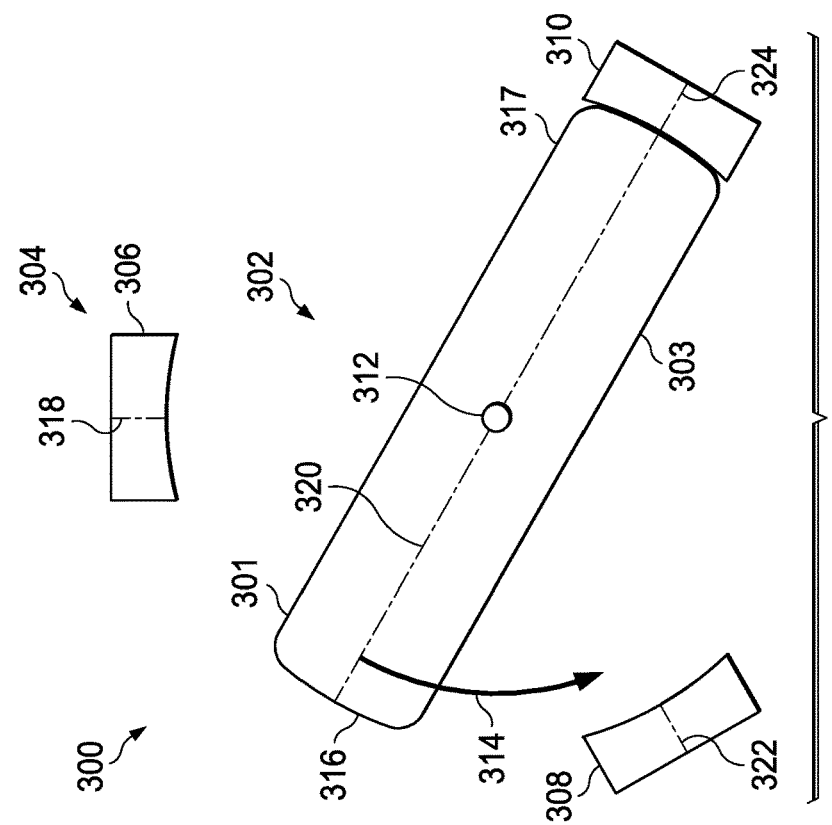
FIG. 5 is an illustration of the operation of an electric motor using a repulsive force in accordance with an illustrative embodiment.

With reference next to FIG. 5, an illustration of the operation of an electric motor using a repulsive force is depicted in accordance with an illustrative embodiment. In this example, rotor 302 has rotated such that centerline 320 of rotor 302 lines up with centerline 324 of stator coil 310.

In this position, stator coil 306 is turned off. In other words, alternating current 400 of FIG. 4 no longer flows through stator coil 306. As a result, alternating magnetic field 404 of FIG. 4 is no longer present.

Figure 6:
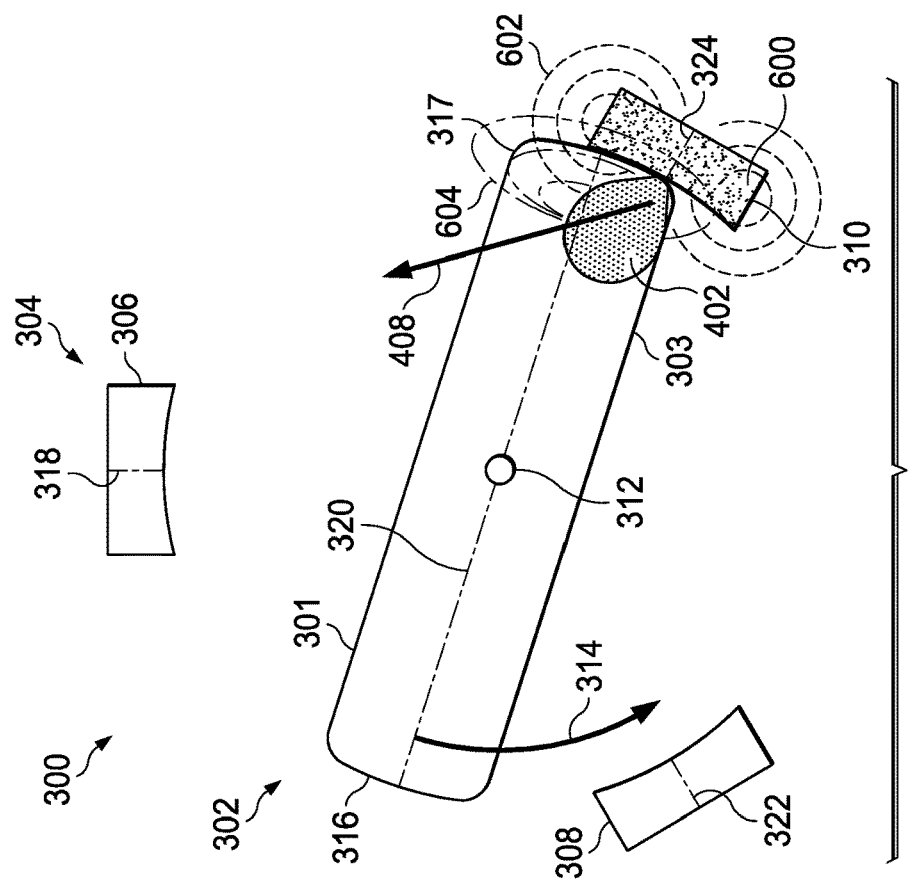
FIG. 6 is an illustration of the operation of an electric motor using a repulsive force in accordance with an illustrative embodiment.

In FIG. 6, an illustration of the operation of an electric motor using a repulsive force is depicted in accordance with an illustrative embodiment. As depicted, rotor 302 has rotated from the position shown in FIG. 5 to the position shown in FIG. 6 through the moment of inertia in rotor 302.

In this figure, rotor 302 has rotated such that centerline 320 of end 317 of rotor 302 has passed centerline 324 of stator coil 310. In other words, the alignment of end 317 of rotor 302 with stator coil 310 is such that an offset is present between centerline 324 for stator coil 310 and centerline 320 of end 317.

With this alignment of end 317 and stator coil 310, alternating current 600 is sent through stator coil 310, turning on stator coil 310. In other words, alternating current 600 is sent through stator coil 310 as end 317 of rotor 302 rotates past centerline 324 of stator coil 310. With alternating current 600 flowing through stator coil 310, alternating magnetic field 602 is generated.

Alternating magnetic field 602 causes eddy current 402 to flow through end 317 of rotor 302. In turn, eddy current 402 generates alternating magnetic field 604 at end 317 of rotor 302.

Alternating current 600 in stator coil 310 and eddy current 402 results in repulsive force 408 from the interaction between alternating magnetic field 602 and alternating magnetic field 604. As a result, torque is applied to rotor 302, causing rotor during 302 to turn in the direction of arrow 314.

Figure 7:
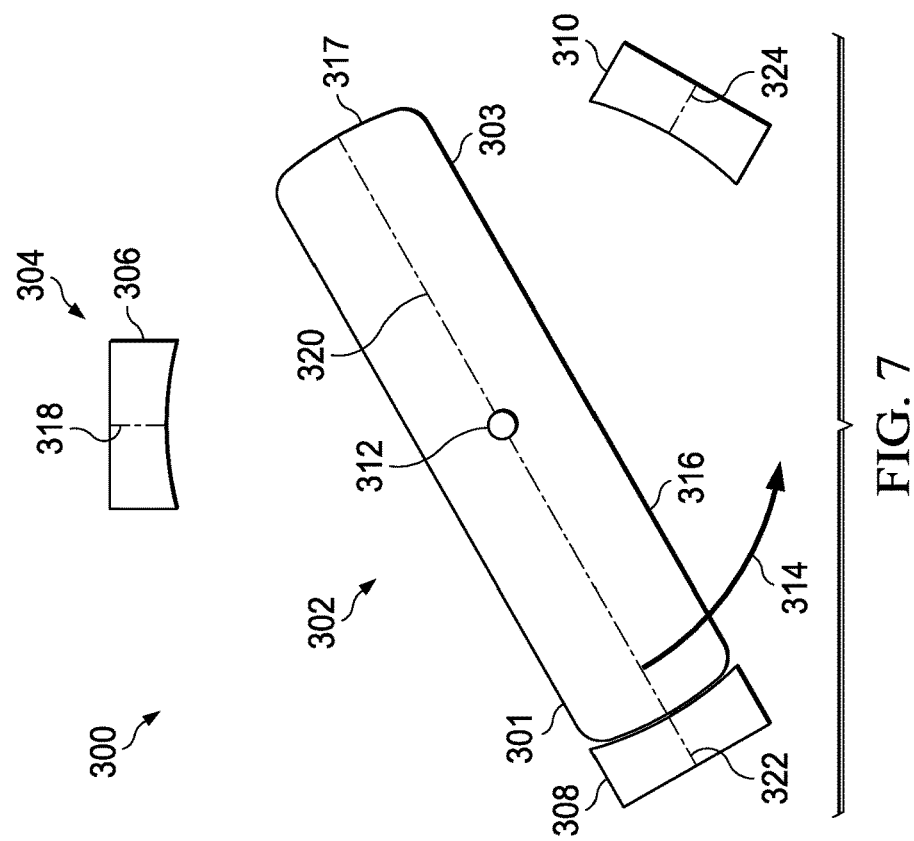
FIG. 7 is an illustration of the operation of an electric motor using a repulsive force in accordance with an illustrative embodiment.

Turning next to FIG. 7, an illustration of the operation of an electric motor using a repulsive force is depicted in accordance with an illustrative embodiment. Rotor 302 has rotated such that centerline 320 of end 316 is lined up with centerline 322 of stator coil 308. In this position, stator coil 310 is turned off.

With reference to FIG. 8, an illustration of the operation of an electric motor using a repulsive force is depicted in accordance with an illustrative embodiment. As depicted, rotor 302 has rotated from the position shown in FIG. 7 to the position shown in FIG. 8 through the moment of inertia in rotor 302.

In this illustration, centerline 320 of rotor 302 is aligned with centerline 322 of stator coil 308. The alignment is such that centerline 320 is offset from centerline 322.

With this alignment, stator coil 308 is turned on with alternating current 800 flowing through stator coil 308, and alternating magnetic field 802 is generated by stator coil 308. As a result, eddy current 402 flows in end 316 of rotor 302. Eddy current 402 results in alternating magnetic field 804.

In this manner, alternating current 800 and eddy current 402 generate repulsive force 408. Repulsive force 408 causes rotation of rotor 302 in the direction of arrow 314. This rotation of rotor 302 causes rotor 302 to rotate back to the position shown in FIG. 3.

In the depicted example, the pattern of turning on and off stator coils 304 occurs such that torque is always present in the direction of arrow 314. As described, the alignment of end 316 and stator coils 304 during the operation of electric motor 300 occurs such that an offset is present between centerline 320 of end 316 of rotor 302 and the centerlines of stator coils 304. In the illustrative example, the offset is measured in degrees. The number of degrees may vary depending on the particular implementation.

The illustrations of electric motor 300 in FIGS. 3-8 have been shown for purposes of illustrating one implementation of electric motor 108 shown in block form in FIG. 1. The illustration of electric motor 300 is not meant to limit the manner in which electric motor 108 may be implemented in other illustrative examples.

Although stator coils 304 includes three stator coils, as shown in electric motor 300, other numbers of stator coils 304 may be used in other illustrative examples. For example, two, five, seven, or some other number of stator coils 304 may be used in electric motor 300 in other illustrative examples.

In this illustrative example, number of stator coils may depend on the configuration of rotor 302. As depicted, rotor 302 has two elongate members in the form of arm 301 and arm 303 extending from axis 312. In other illustrative examples, the number of arms may vary.

In selecting the number of stator coils 304 and arms for rotor 302, the number of stator coils 304 may be selected in a number of different ways. For example, the number of stator coils 304 may be selected as a value that is greater than two and not equal to the number of arms for rotor 302 multiplied by 0.5, 1, or 2. The ratios of 0.5, 1, and 2 permit rotor 302 to occupy positions, wherein the repulsive forces from stator coils 304 are symmetric. These ratios are less desirable for rotor 302 because when positions are present in which the repulsive forces are symmetric, these positions produce zero net torque on rotor 302.

As a result, rotor 302 cannot start moving again if rotor 302 stops in one of these positions. For example, a configuration that has four stator coils 304 and two arms on rotor 302 is less desirable.

In one example of a desirable configuration, the number of stator coils 304 and the number of arms for rotor 302 may be one different from each other or consecutive. For example, ten stator coils may be used for stator coils 304 when rotor 302 has nine arms.

In another example of a desirable configuration, the number of stator coils 304 may be a multiple of three. For example, six stator coils 304 may be used for stator coils 304 when four arms are present in rotor 302. Multiples of three stator coils 304 allow the motor to operate with three commutator phases.

In the illustrative example in FIG. 3, electric motor 300 is shown with rotor 302 having centerline 320 that is slightly past centerline 318 of stator coil 306 as a starting position when electric motor 300 begins the operation from a dead stop. In controlling the operation of electric motor 300, current may be sent through stator coils 304 such that rotor 302 turns in the direction of arrow 314 or in the opposite direction, if desired, from a dead stop, regardless of the starting position of rotor 302. For example, if centerline 320 of end 316 lines up with centerline 318 of stator coil 306, a slight overlap in sending an alternating current to stator coil 306 and stator coil 308 may be used to cause rotation of rotor 302 in the direction of arrow 314.

In the depicted example, a slight overlap of sending an alternating current to stator coils 304 may be present such that more than one stator coil in stator coils 304 may be turned on. For example, when centerline 320 of end 316 of rotor 302 lines up with centerline 318 of stator coil 306, stator coil 310 is still turned on.

Thus, when rotor 302 starts with the centerlines that line up with each other, rotor 302 does not stay at that position or rotate in an undesired direction. Stator coil 310 is turned off when centerline 320 of end 316 of rotor 302 rotates a few degrees past centerline 318 of stator coil 306.

The same pattern applies when centerline 320 of end 316 of rotor 302 coincides with centerline 322 of stator coil 308. In this position, stator coil 306 is still turned on for a few degrees of rotation. A similar sequence occurs when end 316 of rotor 302 moves past stator coil 310.

A different pattern of turning on stator coils 304 may be used to rotate rotor 302 in a direction opposite of arrow 314. In other words, rotor 302 may be rotated either a counter-clockwise or a clockwise motion. Further, at least one of the amount of current and duration of current sent through one or more stator coils 304 may be used to change at least one of the speed, the torque, or the direction of rotation of rotor 302.

Further, sensors may be used to measure the speed of rotation. This measurement may be used to eliminate overlap regions when rotor 302 in electric motor 300 rotates above some threshold speed. In this manner, the amount of spikes in electrical power needed to send current through two of stator coils 304, as described, is reduced or eliminated after rotor 302 has begun rotating.

With reference now to FIG. 9, an illustration of a dual frequency electric motor is depicted in accordance with an illustrative embodiment. As depicted, a top cross-sectional view of dual frequency electric motor 900 is shown. In this illustrative example, dual frequency electric motor 900 includes rotor 902 and stator coils 904. Dual frequency electric motor 900 uses both a repulsive force and an attractive force to rotate rotor 902. Using both the repulsive force and an attractive force allows for one hundred percent duty cycle for each stator coil, and also increases the torque that may be generated by dual frequency electric motor 900.

In this illustrative example, rotor 902 has arm 905 and arm 906 extending from axis 908. As seen in this cross-sectional view, rotor 902 includes core 910 and layer 912. Layer 912 is a coating formed on core 910.

In this illustrative example, core 910 is comprised of a conductive ferromagnetic material. In this example, conductive ferromagnetic material may be selected from at least one of iron, iron oxide, nickel, or samarium cobalt.

Layer 912 is comprised of a conductive non-ferromagnetic material. In this example, conductive non-ferromagnetic material is selected from at least one of aluminum, copper, gold, intercalated graphene, lead, silver, tin, titanium, or zinc.

In this illustrative example, stator coils 904 include three stator coils. More specifically, stator coils 904 include stator coil 914, stator coil 916, and stator coil 918.

As depicted, dual frequencies may be used to operate dual frequency electric motor 900. In this illustrative example, a first frequency may be used to generate an attractive force, while the second frequency may be used to generate a repulsive force in dual frequency electric motor 900. This type of motor may be also referred to as a dual frequency electric motor, in which at least one of an attractive force or a repulsive force is used to rotate rotor 902.

In selecting the thickness of layer 912, layer 912 has an electrical skin depth ($\delta$) that depends on the material's conductivity and permeability, as well as the frequency of an applied magnetic field. In this illustrative example, the skin depth is a distance between an outer surface and a level where a current flows. The skin depth determines the current density (J) at depth (d) in accordance with:

$$J = J_\delta e^{-d/\delta}$$

where (Js) is current density at the surface. Skin depth ($\delta$) may be estimated as follows:

$$\delta = \left(\frac{1}{w}\right)\left\{\left(\frac{\mu\epsilon}{2}\right)\left[\left(1+\left(\frac{1}{\rho\omega\epsilon}\right)^2\right)^{1/2} - 1\right]\right\}^{-1/2}$$

where $\rho$=resistivity of the conductor; $\omega$=angular frequency of current $2\pi \times$frequency; $\mu_\varphi$=relative magnetic permeability of the conductor; $\mu_0$=the permeability of free space; $\mu=\mu_\varphi\mu_0$; $\epsilon_\varphi$=relative permittivity of the material; $\epsilon_0$=the permittivity of free space; and $\epsilon=\epsilon_\varphi\epsilon_0$.

The coating thickness of layer 912 is chosen so it is much less than one skin depth at low frequency and more than one skin depth at high frequency. The low frequency may be the commutating frequency, from about 30 Hz to 100 Hz. The low frequency may be as low as the direct current. The high frequency may be the alternating current (AC) frequency at which the eddy current motor operates. The frequency may be about 10 kHz. In this illustrative example, layer 912, in the form of an aluminum coating, is about 1.5 millimeters thick.

With reference now to FIG. 10, an illustration of the operation of a dual frequency electric motor is depicted in accordance with an illustrative embodiment. As depicted in this figure, rotor 902 rotates in the direction of arrow 1000 about axis 908.

When end 1004 of arm 905 of rotor 902 approaches stator coil 914, direct current 1006 is sent through stator coil 914. Direct current 1006 flows through stator coil 914 and causes stator coil 914 to generate unidirectional magnetic field 1008. In this illustrative example, unidirectional magnetic field 1008 has a frequency of about 30 Hz. This variation frequency is in the intensity of unidirectional magnetic field 1008.

At this frequency, the skin depth of unidirectional magnetic field 1008 is about 14 millimeters. If the frequency is 0 Hz, the skin depth is infinite. As a result, almost all of the magnetic flux in unidirectional magnetic field 1008 passes through layer 912, which is about 1.5 millimeters.

Unidirectional magnetic field 1008 generates attractive force 1010 on core 910. Attractive force 1010 pulls end 1004 of arm 905 of rotor 902 towards stator coil 914. This pull on core 910 causes rotor 902 to rotate about axis 908 in the direction of arrow 1000.

With reference next to FIG. 11, an illustration of the operation of a dual frequency electric motor is depicted in accordance with an illustrative embodiment. In this figure, end 1004 of arm 905 of rotor 902 is shown as beginning to rotate past stator coil 914. In this position of rotor 902, the flow of direct current 1006 of FIG. 10 is turned off, and a flow of alternating current 1100 occurs through stator coil 914.

Alternating current 1100 flowing through stator coil 914 causes alternating magnetic field 1102. In this illustrative example, alternating magnetic field 1102 has a frequency of about 10 kHz. At this frequency, the skin depth of the aluminum in layer 912 is about 0.8 millimeters. The majority of alternating magnetic field 1102 is blocked by eddy current 1104 flowing within layer 912.

Eddy current 1104 causes alternating magnetic field 1106 to be generated. The interaction of these magnetic fields results in repulsive force 1108 to occur between stator coil 914 and end 1004 of arm 905 of rotor 902 such that rotor 902 rotates about axis 908 in the direction of arrow 1000. This pattern of direct current 1006 and alternating current 1100 flowing through stator coil 914 may also be applied to stator coil 916 and stator coil 914 for similar positions of end 1004 of rotor 902 with respect to stator coil 916 and stator coil 918.

The illustrations of dual frequency electric motor 900 in FIGS. 9-11 are provided for the purpose of illustrating an implementation for electric motor 108, as shown in block form in FIG. 1. As depicted, dual frequency electric motor 900 uses attractive force 1010, in addition to repulsive force 1108 to rotate rotor 902.

Figure 12:
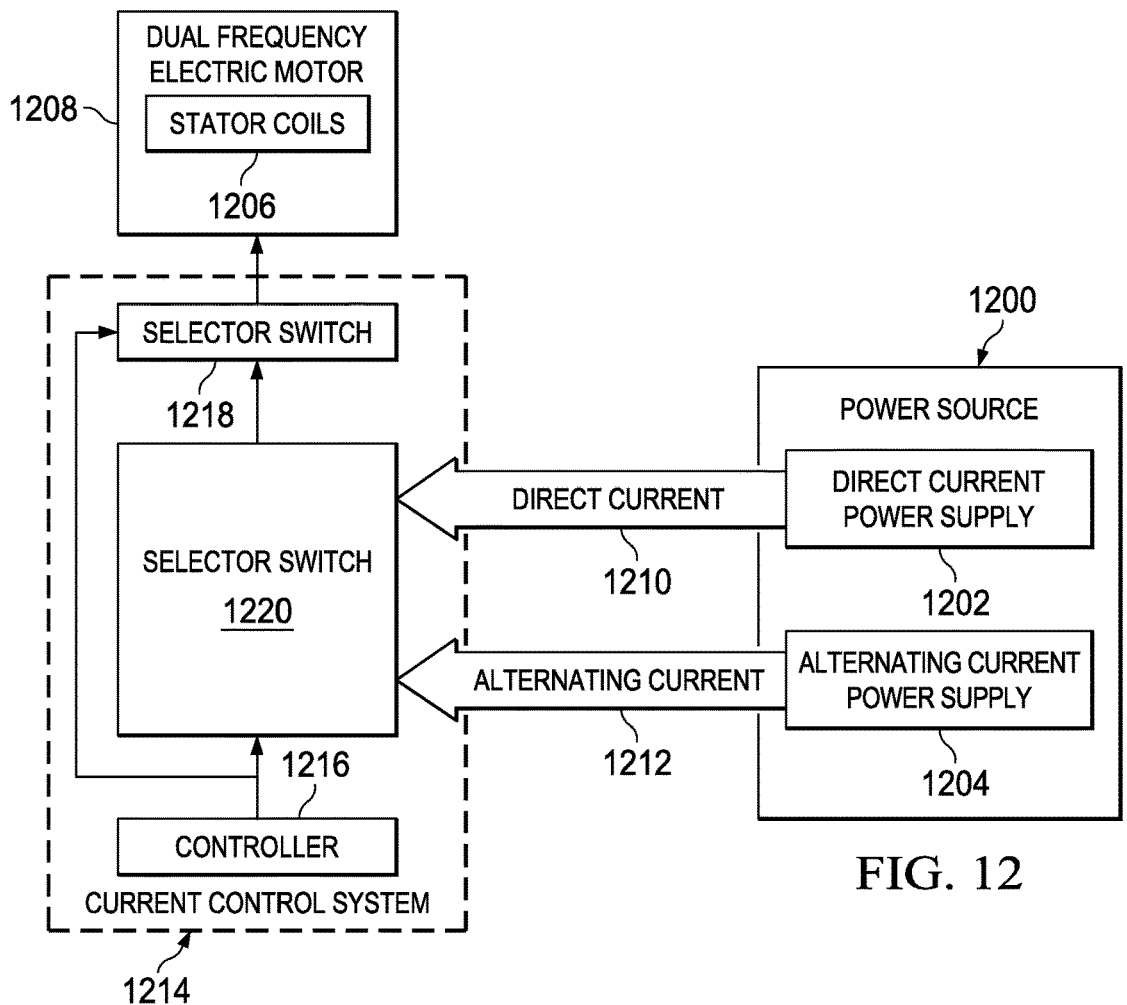
FIG. 12 is an illustration of a block diagram of a power source for a dual frequency electric motor in accordance with an illustrative embodiment.

With reference now to FIG. 12, an illustration of a block diagram of a power source for a dual frequency electric motor is depicted in accordance with an illustrative embodiment. This figure shows one manner in which a dual frequency electric motor, such as dual frequency electric motor 900 in FIG. 9, may be powered.

In this illustrative example, power source 1200 includes direct current power supply 1202 and alternating current power supply 1204. Power source 1200 is an example of an implementation for power source 114, as shown in block form in FIG. 1. Power source 1200 supplies both direct current 1210 and alternating current 1212 to stator coils 1206 in dual frequency electric motor 1208. Each power supply has a different frequency.

In this illustrative example, current control system 1214 is an example of an implementation for current control system 112, as shown in block form in FIG. 1. As depicted, current control system 1214 includes controller 1216, selector switch 1218, and selector switch 1220. Current control system 1214 is an example of one implementation for current control system 112 shown in block form in FIG. 1.

Controller 1216 may be implemented in at least one of hardware, software, or some combination thereof. Controller 1216 may take the form of commutation electronics. Controller 1216 controls selector switch 1220 to select the frequency by selecting one of direct current power supply 1202 or alternating current power supply 1204. In this illustrative example, alternating current power supply 1204 has a frequency of about 10 kHz.

The current from the selected power supply is sent to selector switch 1218. Controller 1216 controls selector switch 1218 to direct the selected current to a particular coil in stator coils 1206. In the illustrative example, the current may be directed to more than one stator coil in stator coils 1206, depending on the particular implementation.

In this illustrative example, a substantially one hundred percent duty cycle for torque is provided from each stator coil in stator coils 1206. The configuration increases the average torque from an electric motor of a given size, compared to the fifty percent duty cycle from each stator coil in a reluctance motor.

Figure 13:
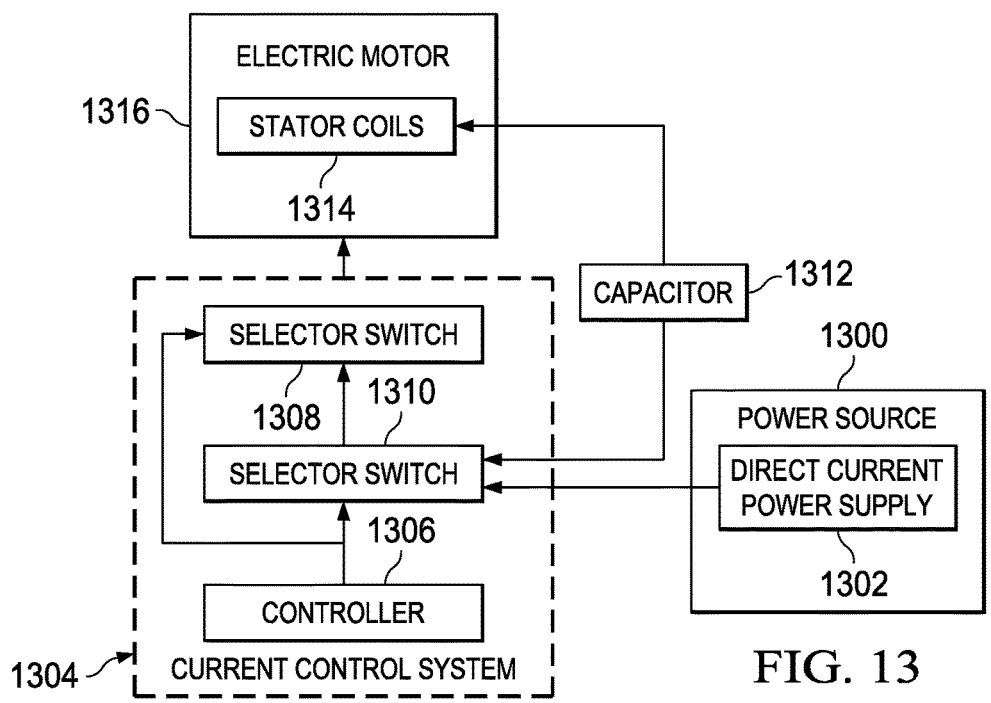
FIG. 13 is an illustration of a block diagram of a power source for a dual frequency electric motor in accordance with an illustrative embodiment.

With reference now to FIG. 13, an illustration of a block diagram of a power source for a dual frequency electric motor is depicted in accordance with an illustrative embodiment. In this illustrative example, power source 1300 is direct current power supply 1302. Current control system 1304 comprises controller 1306, selector switch 1308, and selector switch 1310.

As depicted, capacitor 1312 is connected in parallel to stator coils 1314 in electric motor 1316 and selector switch 1310. Current control system 1304 is an example of one implementation for current control system 112 shown in block form in FIG. 1

During operation, controller 1306 controls selector switch 1310 to send current from direct current power supply 1302 into selector switch 1308. Additionally, controller 1306 controls selector switch 1308 to select a particular stator coil in stator coils 1314 to connect to direct current power supply 1302. Direct current power supply 1302 is used to supply current until the end of the rotor is in its closest position to the selected coil. While direct current power supply 1302 is connected, direct current power supply 1302 also charges capacitor 1312.

When the end of the rotor is at its closest position, controller 1306 then disconnects direct current power supply 1302 and connects capacitor 1312 to the stator coil using selector switch 1308. As a result, a circuit is formed between the selected stator coil in stator coils 1314 and capacitor 1312. Current flows into capacitor 1312.

The stator coil and capacitor 1312 form an inductor capacitor (LC) tank circuit that oscillates to send an alternating current through the coil. This alternating current causes an eddy current in the rotor, causing a repulsive force that rotates the rotor.

In selecting a value for capacitor 1312, the frequency ($\omega_0$) at which skin effect is fully contained in the conductive coating of the rotor and the inductance of the coil (L) are used to identify the value for capacitance (C) for capacitor 1312 using the following:

$$f_0 = \frac{\omega_0}{2\pi} = \frac{1}{2\pi\sqrt{LC}}$$

In this example, the frequency ($\omega_0$) at which skin effect is fully contained in the conductive coating of the rotor may be selected as a frequency at which the skin depth is less than half the thickness of the layer coating the core of the rotor.

In the illustrative example, each stator coil in stator coils 1314 is connected to capacitor 1312. In another illustrative example, each stator coil may have a capacitor instead of using a single capacitor, capacitor 1312, for all of stator coils 1314 as depicted in FIG. 13.

Figure 14:
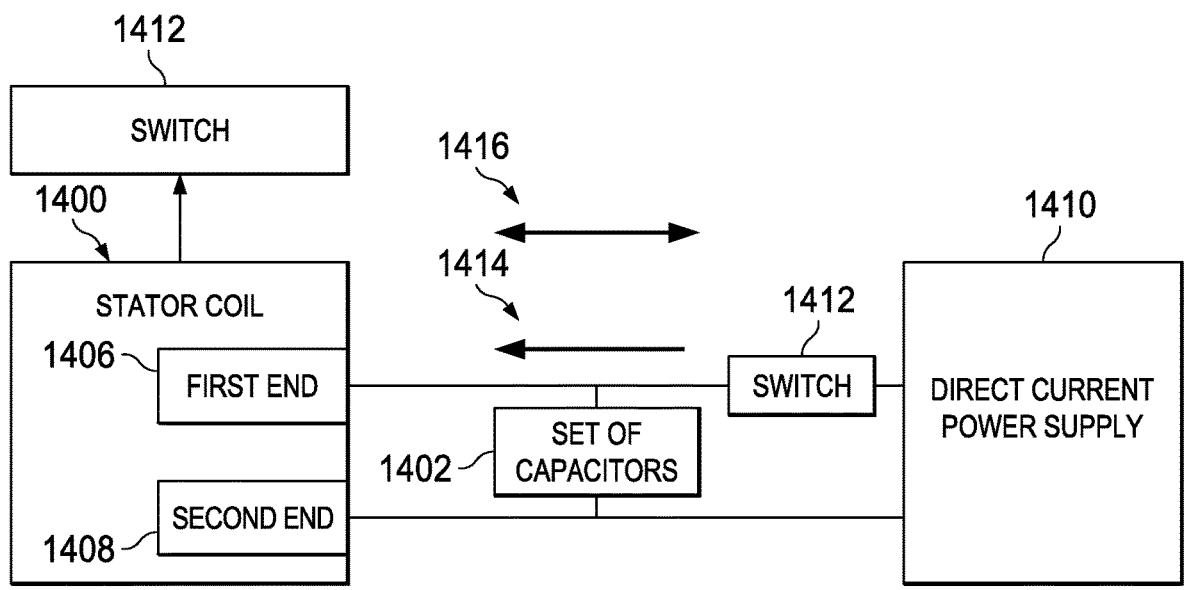
FIG. 14 is an illustration of a block diagram of a power source for a dual frequency electric motor in accordance with an illustrative embodiment.

With reference now to FIG. 14, an illustration of a block diagram of a power source for a dual frequency electric motor is depicted in accordance with an illustrative embodiment. In this figure, stator coil 1400 is connected to set of capacitors 1402.

As used herein, a "set of", when used with reference to items, means one or more items. For example, set of capacitors 1402 is one or more capacitors. For example, multiple capacitors may be connected in series, parallel, or some combination thereof to obtain a desired level of capacitance.

As depicted, set of capacitors 1402 is connected to first end 1406 of stator coil 1400 and second end 1408 of stator coil 1400. Additionally, first end 1406 is connected to direct current power supply 1410 through switch 1412. Second end 1408 is connected to direct current power supply 1410.

In this configuration, set of capacitors 1402 is connected in parallel to stator coil 1400 and direct current power supply 1410. In this illustrative example, stator coil 1400 and set of capacitors 1402 form a resonant inductor capacitor (LC) tank circuit.

When switch 1412 is closed, direct current power supply 1410 applies a direct current voltage to both stator coil 1400 and set of capacitors 1402. With switch 1412 closed, current flows in the direction of arrow 1414 and through stator coil 1400. During this time, set of capacitors 1402 is charged. Further, an attractive force is generated by unidirectional magnetic field 1008 generated by stator coil 1400 in FIG. 8 with a direct current from direct current power supply 1410 flowing through stator coil 1400.

When switch 1412 is open, stator coil 1400 is disconnected from direct current power supply 1410. Current continues to flow in the direction of arrow 1414, draining the charge from set of capacitors 1402, and then charging set of capacitors 1402 with the opposite polarity and a higher voltage than the direct current power supply 1410.

The resonant inductor capacitor (LC) tank formed by stator coil 1400 and set of capacitors 1402 then oscillates with current flowing in the direction of arrow 1416. The oscillation of current decays over time. This oscillation of the current causes eddy currents in the rotor, thus resulting in a repulsive force that turns the rotor.

This configuration in which each stator coil has a set of capacitors uses more capacitors than the configuration shown in FIG. 13, in which only a single capacitor is used with the stator coils. Associating a set of capacitors with each of the stator coils results in using fewer switches.

The configurations of the power sources in FIG. 13 and FIG. 14 both provide a duty cycle that is greater than fifty percent, but less than one hundred percent for torque from each stator coil. This type of performance is greater than a reluctance motor, but less than dual frequency electric motor 1208 using power source 1200 with direct current power supply 1202 and alternating current power supply 1204 as depicted in FIG. 12.

The illustrations of the dual frequency electric motor system in FIGS. 9-14 have been provided for purposes of illustrating one manner in which a dual frequency electric motor may be implemented for electric motor 108, as shown in block form in FIG. 1. This illustration is not meant to limit the manner in which other dual frequency electric motors are implemented.

For example, other number of arms, other than the two arms shown for rotor 902 in dual frequency electric motor 900, may be used. For example, rotor 902 may be implemented using three arms, four arms, or some other number of arms. Further, the number of stator coils 904 also may change based on the configuration of rotor 902.

Figure 15:
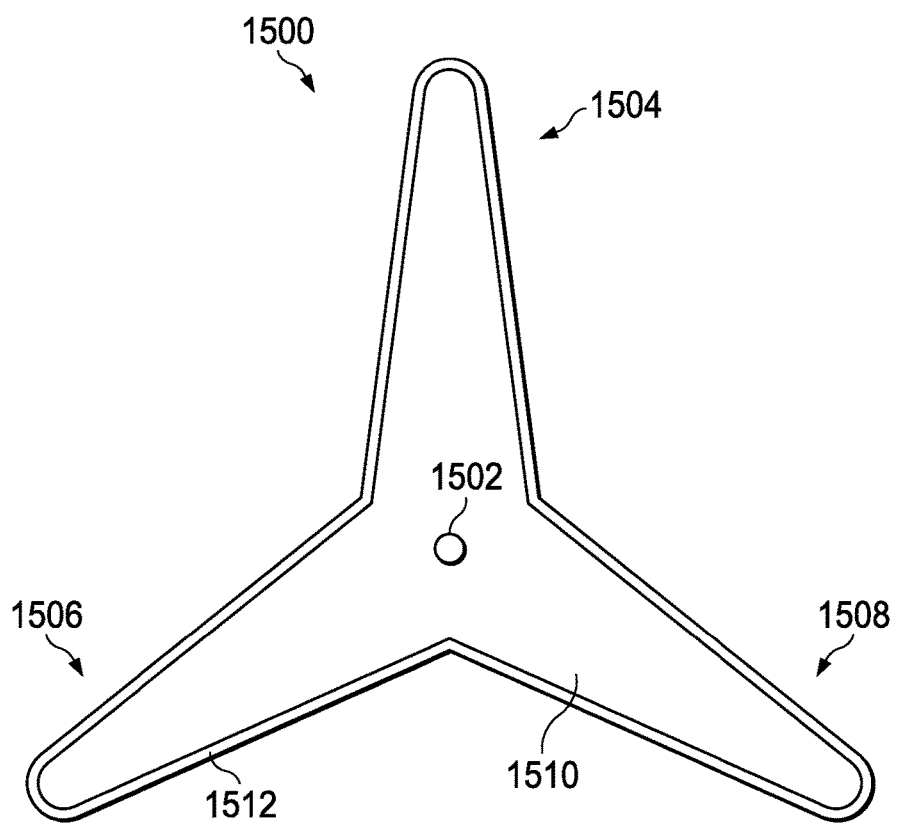
FIG. 15 is an illustration of a rotor for an electric motor in accordance with an illustrative embodiment.

Turning next to FIG. 15, an illustration of a rotor for an electric motor is depicted in accordance with an illustrative embodiment. As depicted, rotor 1500 is an example of one implementation of rotor 116, as shown in block form in FIG. 1.

As depicted, rotor 1500 is rotatable about axis 1502. Rotor 1500 has three arms: arm 1504, arm 1506, and arm 1508. As can be seen, these arms taper in width as the arms extend away from axis 1502.

Additionally, rotor 1500 may be comprised of more than one material. In this example, rotor 1500 includes core 1510. Core 1510 may be comprised of material having a high ratio of tensile strength to density, which enables rotor 1500 to rotate with higher speed at the tips of the arms as compared to currently used rotors.

For example, the ratio of tensile strength to density may be selected to provide a strength-to-density ratio at least as great as that of beryllium. The strength-to-density ratio of beryllium is about 200,000 Pascals per kilogram per cubic meter.

As depicted, core 1510 may be comprised of material having anisotropic tensile strength because the stress in the rotor is mostly in the radial direction. This type of material may provide rotor 1510 a higher ratio of tensile strength in the radial direction to density. For example, standard unidirectional carbon-fiber-reinforced plastic (CFRP) with about 60 percent fiber volume results in a radial strength-to-density ratio that may be at least as great as about 937,500 Pascals per kilogram per cubic meter.

The material in core 1510 also may be electrically conductive. The material in core 1510 also may have a desired level of thermal conductivity as compared to materials currently used in rotors. Increased thermal conductivity helps transport heat produced by eddy currents near the tip of rotor 1500 to other parts of rotor 1500. As a result, the materials in rotor 1500 may be maintained at temperatures that have a desired level of strength. For example, beryllium and aluminum have a substantially higher thermal conductivity than iron or steel. As depicted, beryllium has a thermal conductivity of 175 W/m-K, and aluminum has a thermal conductivity of 220 W/m-K. In contrast, iron and steel have a thermal conductivity of 16 W/m-K to 60 W/m-K, which are typical values for these materials and alloys.

Further, rotor 1500 also has layer 1512 to cover some or all of core 1510. As depicted, layer 1512 is electrically conductive and may be formed using a conductive non-ferromagnetic material. For example, when core 1510 is non-conductive, the thickness of layer 1512 may be selected to be about two times the skin depth for the alternating current frequency and the material in layer 1512 that is used.

With this design and selection of materials, rotor 1500 may rotate faster than currently used rotors that have solid iron arms that are uniform in width and thickness, rather than taper. In this manner, faster and lighter electric motors may be manufactured.

The illustration of rotor 1500 in FIG. 15 is not meant to limit the manner in which other rotors may be implemented for use in electric motor 108, as shown in block form in FIG. 1. For example, other rotors may have other number of arms, such as two arms, six arms, seven arms, or some other number arms. In still other illustrative examples, the layer on the core may not fully encapsulate the core. For example, a portion of core may be exposed that is closer to the axis of rotation with the portion of rotor that is closer to the ends of the arms being covered by the layer.

Further, rotor 1500 may be rotated using a repulsive force or both a repulsive force and an attractive force. A selection of materials for core 1510 and layer 1512 may be made based on whether a repulsive force or both a repulsive force and an attractive force are to be used to rotate rotor 1500.

Figure 16:
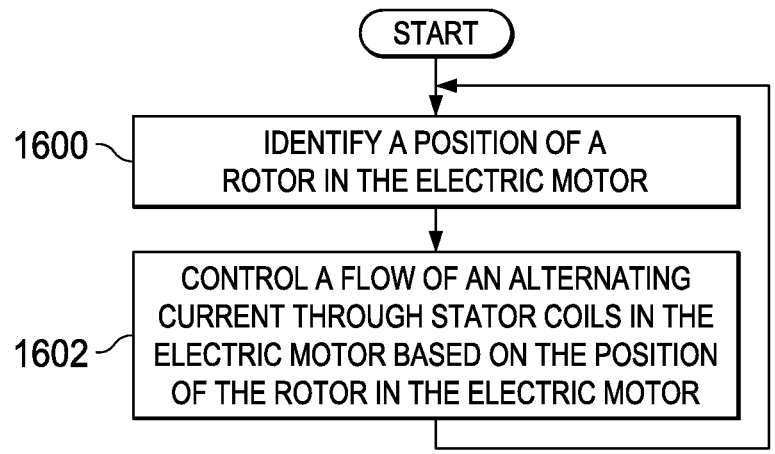
FIG. 16 is a flowchart of a process for controlling an electric motor in accordance with an illustrative embodiment.

Turning next to FIG. 16, a flowchart of a process for controlling an electric motor is depicted in accordance with an illustrative embodiment. The process illustrated in FIG. 16 may be implemented in electric motor environment 100 in FIG. 1. In particular, the different operations may be implemented using electric motor system 102 in FIG. 1.

The process begins by identifying a position of a rotor in electric motor (operation 1600). In this illustrative example, the position identifies the position of an end of an arm for the rotor.

The process controls a flow of an alternating current through stator coils in the electric motor, based on the position of the rotor in the electric motor (operation 1602), with the process returning to operation 1600. In operation 1602, the flow of the alternating current is controlled such that a repulsive force between a rotor and a stator coil in the stator coils occurs when the alternating current flows through the stator coil.

This process is repeated while the electric motor is operating. Further, control of the flow of alternating current may be performed to change at least one of a speed, an amount of torque, a direction of rotation, or some other suitable parameter.

Figure 17:
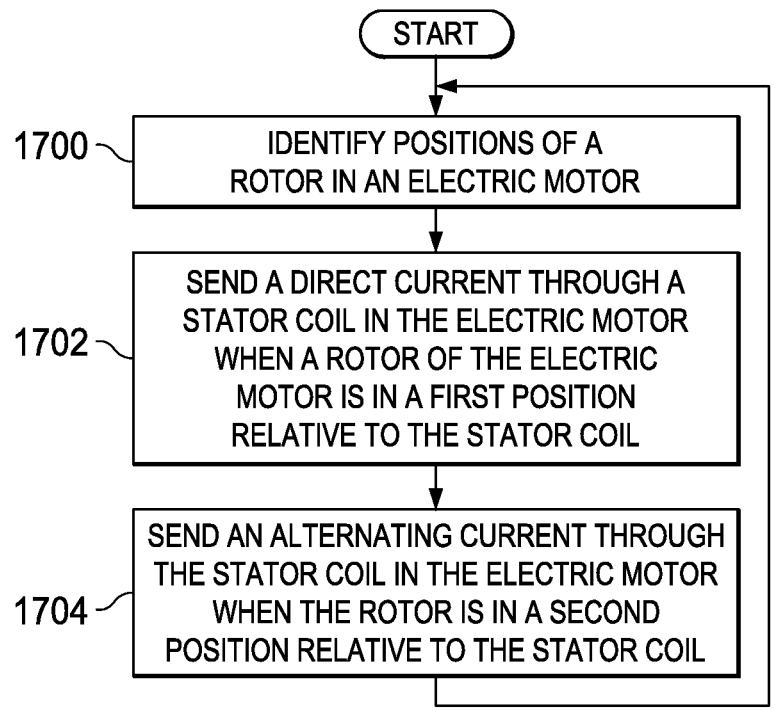
FIG. 17 is a flowchart of a process for controlling a dual frequency electric motor in accordance with an illustrative embodiment.

With reference now to FIG. 17, a flowchart of a process for controlling a dual frequency electric motor is depicted in accordance with an illustrative embodiment. The process illustrated in FIG. 17 may be implemented using dual frequency electric motor 900 in FIG. 9.

The process begins by identifying positions of a rotor in an electric motor (operation 1700). These positions include a first position and a second position relative to a stator coil in stator coils in the electric motor.

The process sends a direct current through a stator coil in the electric motor when a rotor of the electric motor is in a first position relative to the stator coil (operation 1702). In operation 1702, an attractive force between the stator coil and the rotor rotates the rotor about the axis.

The process sends an alternating current through the stator coil in the electric motor when the rotor is in a second position relative to the stator coil (operation 1704), with the process returning to operation 1700. In operation 1704, a repulsive force between the stator coil and the rotor rotates the rotor about the axis.

In this manner, both an attractive force and a repulsive force are used to operate the electric motor. By using both types of forces, the speed, torque, at least one of speed, duty cycle, or the parameters, may be improved compared to currently used electric motors.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 18:
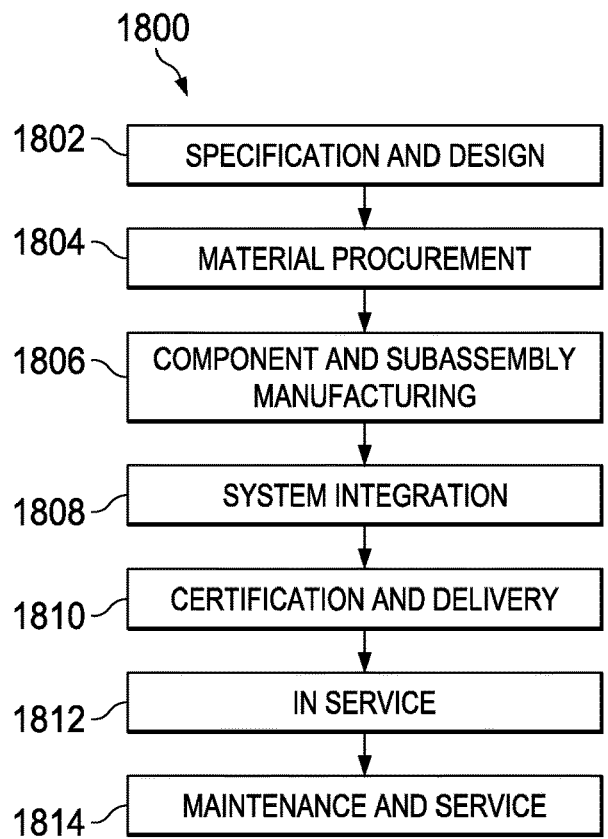
FIG. 18 is an illustration of a block diagram of an aircraft manufacturing and service method in accordance with an illustrative embodiment.
Figure 19:
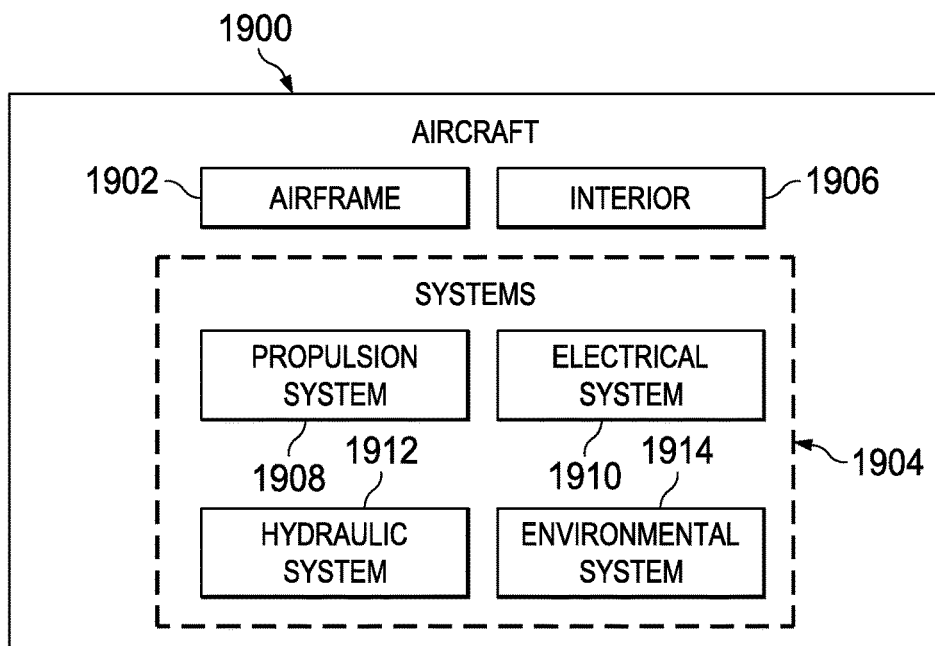
FIG. 19 is an illustration of a block diagram of an aircraft in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 may go through certification and delivery 1810 in order to be placed in service 1812. While in service 1812 by a customer, aircraft 1900 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of a block diagram of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. In one illustrative example, components or subassemblies for an electric motor system in the illustrative examples may be produced in component and subassembly manufacturing 1806 in FIG. 18 may be fabricated or manufactured in a manner similar to components or subassemblies produced while aircraft 1900 is in service 1812 in FIG. 18. In another illustrative example, the electric motor system in the illustrative examples may be used in equipment used to fabricate components or subassemblies for aircraft 1900.

One or more apparatus embodiments, method embodiments, or a combination thereof may be utilized while aircraft 1900 is in service 1812. For example, an electric motor system in accordance with an illustrative embodiment may operate within aircraft 1900 while aircraft 1900 is in service 1812. For example, the electric motor system may be used for flight control actuators that move control surfaces such as flaps, ailerons, and control surfaces. Further, the size of the electric motor may also provide a desired level of torque such that the electric motor may be used inside spaces, such as the wings of an aircraft, a vertical stabilizer, a horizontal stabilizer, or some other suitable location.

Additionally, the electric motor system in the illustrative examples may control valves for fluid systems in aircraft 1900. The use of a number of the different illustrative embodiments may substantially expedite the assembly of aircraft 1900, reduce the cost of aircraft 1900, or both expedite the assembly of aircraft 1900 and reduce the cost of aircraft 1900.

Thus, one or more illustrative examples provide an electric motor that has higher levels of acceleration for torque as compared to currently used electric motors. Increased amounts of torque may be especially useful in aircraft in which spaces, such as those in wings of aircraft, often require motors with smaller sizes, but also desire higher levels of torque than available to currently used electric motors. Further, the increased amount of torque provided by the electric motor in the different illustrative examples may be useful in manufacturing robots as well as other imitations in which torque is a desirable factor when selecting electric motors.

The electric motors shown and described in the illustrative examples may provide at least one of a desired level of torque or rotary power over a wide range of speeds. Further, the electric motors described in the illustrative examples may provide a desired level of responsiveness with respect to starting, stopping, and changing speeds or directions. The electric motors provide these features with a configuration that is at least one of smaller, lighter, or cheaper than currently used electric motors.

Further, the electric motors in the illustrative examples are lighter and have fewer parts as compared to reluctance motors. Also, the rotors in the illustrative examples may be used at higher speeds as compared to those in reluctance motors. The higher speeds result from the rotors being constructed having a higher weight ratio as compared to currently used rotors in reluctance motors because the commutation voltage does not rise with motor speed.

Further, increase in acceleration as compared to current electric motors are present because of a lower moment of inertia based on materials that may be selected for rotors used in the illustrative examples as compared to reluctance motors. Moreover, the controller in the illustrative examples may have a lower cost because the circuit used switches an alternating current instead of the direct current.

The electric motors in the illustrative examples are more efficient than currently used induction motors. In the illustrative examples, the frequency of rotation of an electric motor is decoupled from the alternating current frequency. For example, the frequency of rotation may be tens of hertz while the frequency of the alternating current may be tens of kilohertz.

Also, the electric motors in the illustrative examples provide advantages over brushless direct current motors. For example, permanent magnets are unnecessary. As a result, the electric motors in the illustrative examples may provide the same or better power density without using permanent magnets. As a result, the electric motors in the illustrative examples may be less complex, thus resulting in a lower assembly cost as well as having a lower material cost as compared to brushless direct current motors.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Further, many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. An apparatus comprising:
   a rotor comprising an electrically conductive material, wherein the rotor is rotatable about an axis;
   stator coils positioned adjacent to the rotor such that an eddy current is generated in the rotor when an alternating current flows through the stator coils; and
   a current control system that controls a flow of the alternating current through the stator coils based on a position of the rotor, wherein a stator coil in the stator coils generates an alternating magnetic field when the alternating current flows through the stator coil causing the eddy current in the rotor such that a repulsive force between the stator coil and the rotor rotates the rotor about the axis.

2. The apparatus of claim 1, wherein the current control system sends the alternating current through the stator coil when the position of the rotor is such that an end of the rotor is adjacent to the stator coil.

3. The apparatus of claim 1, wherein the electrically conductive material is selected from at least one of a conductive ferromagnetic material or a conductive non-ferromagnetic material.

4. The apparatus of claim 3, wherein the conductive ferromagnetic material is selected from at least one of iron, iron oxide, nickel, or samarium cobalt.

5. The apparatus of claim 3, wherein the conductive non-ferromagnetic material is selected from at least one of aluminum, copper, gold, intercalated graphene, lead, silver, tin, titanium, or zinc.

6. The apparatus of claim 1, wherein each of the stator coils has a different resonant frequency from other stator coils in the stator coils and further comprising:
   a power source configured to transmit power to the stator coils by a wireless magnetic coupling to the stator coils, wherein the power transmitted results in the alternating current flowing through the stator coils.

7. The apparatus of claim 1, wherein the current control system comprises:
- switches connected to the stator coils, wherein a switch in the switches sends the alternating current through the stator coil when the switch is in a closed position; and
- a controller that controls the switches in controlling the flow of the alternating current through the stator coils based on the position of the rotor, wherein the stator coil in the stator coils generates the alternating magnetic field when the alternating current flows through the stator coil causing the eddy current in the rotor such that the repulsive force between the stator coil and the rotor causes the rotor to rotate about the axis.

8. The apparatus of claim 7, wherein the controller is configured to switch the alternating current through the stator coil in the stator coils in which the rotor has the position in which an end of the rotor is aligned with the stator coil.

9. The apparatus of claim 7 further comprising:
- a rotary encoder that indicates the position of the rotor.

10. The apparatus of claim 7, wherein the controller is comprised of at least one of a solid state circuit, silicon controlled rectifier, or a triode for alternating current circuit.

11. The apparatus of claim 7 further comprising:
- a group of position sensing coils that react with the eddy current in the rotor based on the position of the rotor, wherein the controller identifies the position of the rotor using the group of position sensing coils.

12. The apparatus of claim 1, wherein first ends of the stator coils are connected to an alternating current power supply and the current control system comprises:
- electrical brushes connected to second ends of the stator coils; and
- electrical contacts positioned about the axis wherein the electrical contacts are connected to a power source and are arranged in pattern such that the electrical brushes contact the electrical contacts at different positions of rotor when electrical contacts rotate about the axis controlling the flow of the alternating current through the stator coils.

13. The apparatus of claim 1, wherein the rotor comprises:
- a core comprising a ferromagnetic material; and
- a layer on the core, wherein the layer comprises a conductive non-ferromagnetic material,
- wherein the current control system controls a direct current and the alternating current through the stator coils to selectively attract and repel the rotor.

14. The apparatus of claim 13 further comprising:
- a capacitor connected in parallel to the stator coils and a direct current power supply, wherein the capacitor generates the alternating current from charges stored in the capacitor.

15. The apparatus of claim 1, wherein the stator coils are positioned adjacent to the rotor such that the repulsive force is sufficient to rotate the rotor from any stationary position of the rotor.

16. The apparatus of claim 1, wherein a first frequency of the alternating current is independent of a second frequency of a rotation of the rotor.

17. The apparatus of claim 16, wherein the first frequency of the alternating current is equal to or greater than about 10 kHz.

18. The apparatus of claim 1, wherein the eddy current causes the repulsive force when interacting with the alternating magnetic field causes in which a tangential force in the repulsive force causes a torque that rotates the rotor about the axis.

19. A dual frequency electric motor comprising:
- a rotor rotatable about an axis, wherein the rotor comprises a core formed from a ferromagnetic material and a layer encompassing the core, wherein the layer comprises a conductive non-ferromagnetic material;
- stator coils that are connected to an alternating current power supply and a direct current power supply; and
- a current control system that controls a flow of an alternating current and a direct current through the stator coils based on a position of the rotor, wherein a stator coil in the stator coils generates an alternating magnetic field when the alternating current flows through the stator coil causing a repulsive force between the stator coil and the rotor and generates a unidirectional magnetic field when a direct current flows through the stator coil causing an attractive force between the stator coil and the rotor such that the rotor rotates about the axis.

20. The dual frequency electric motor of claim 19 further comprising:
- capacitors connected in parallel to the stator coils and the direct current power supply, wherein the capacitors are the alternating current power supply when the direct current power supply is disconnected from the stator coils and wherein each stator coil in the stator coils has a set of capacitors that is connected in parallel or series.

21. The dual frequency electric motor of claim 19, wherein conductive ferromagnetic metal is selected from at least one of iron, iron oxide, nickel, or samarium cobalt.

22. The dual frequency electric motor of claim 19, wherein conductive non-ferromagnetic material is selected from at least one of aluminum, copper, gold, intercalated graphene, lead, nickel, silver, tin, titanium, or zinc.

23. A method for controlling an electric motor, the method comprising:
- controlling a flow of an alternating current through stator coils in the electric motor based on a position of a rotor in the electric motor such that a repulsive force between the rotor and a stator coil in the stator coils occurs when the alternating current flows through the stator coil.

24. The method of claim 23 further comprising:
- identifying the position of the rotor.

25. The method of claim 24, wherein the position of the rotor is identified using at least one of a rotary encoder, contacts associated with the rotor, or position sensing coils.

26. The method of claim 23, wherein the rotor comprises a core formed from a ferromagnetic material and a layer encompassing the core, wherein the layer comprises a conductive non-ferromagnetic material and further comprising:
- controlling a flow of a direct current through the stator coil such that an attractive force between the stator coil and the rotor such that the rotor rotates about an axis.

27. A method for controlling an electric motor, the method comprising:
- sending a direct current through a stator coil in stators coils in the electric motor when a rotor of the electric motor is in a first position relative to the stator coil, wherein an attractive force between the stator coil and the rotor rotates the rotor about an axis; and
- sending an alternating current through the stator coil in the electric motor when the rotor is in a second position relative to the stator coil, wherein a repulsive force between the stator coil and the rotor rotates the rotor about the axis.

28. The method of claim 27 further comprising:
identifying positions of the rotor including the first position and the second position.

\* \* \* \* \*